United States Patent
De Zarraga et al.

(10) Patent No.: US 12,041,199 B2
(45) Date of Patent: Jul. 16, 2024

(54) METHODS AND DEVICES FOR MESSAGING WITHIN A PERSONAL SECURITY NETWORK

(71) Applicant: FLARE JEWELRY, INC., Boston, MA (US)

(72) Inventors: Sara Dickhaus De Zarraga, Boston, MA (US); Quinn St. Clair Fitzgerald, Wellesley, MA (US); Michael Garon, Brookline, MA (US)

(73) Assignee: FLARE SAFETY, INC., Lowell, MA (US)

( * ) Notice: Subject to any disclaimer, the term of this patent is extended or adjusted under 35 U.S.C. 154(b) by 281 days.

(21) Appl. No.: 17/289,577

(22) PCT Filed: Oct. 28, 2019

(86) PCT No.: PCT/US2019/058404
§ 371 (c)(1),
(2) Date: Apr. 28, 2021

(87) PCT Pub. No.: WO2020/092270
PCT Pub. Date: May 7, 2020

(65) Prior Publication Data
US 2022/0014624 A1    Jan. 13, 2022

Related U.S. Application Data

(60) Provisional application No. 62/752,106, filed on Oct. 29, 2018.

(51) Int. Cl.
*H04M 3/51* (2006.01)
*H04M 1/72412* (2021.01)
(Continued)

(52) U.S. Cl.
CPC ..... *H04M 3/5116* (2013.01); *H04M 1/72412* (2021.01); *H04W 4/12* (2013.01);
(Continued)

(58) Field of Classification Search
CPC .......... H04M 3/5116; H04M 3/42365; H04M 1/72412; H04M 1/72424;
(Continued)

(56) References Cited

U.S. PATENT DOCUMENTS 4,972,461 A    11/1990    Brown et al.
8,249,547 B1 *  8/2012    Fellner ................. G08B 25/016
                                                    455/556.1

(Continued)

FOREIGN PATENT DOCUMENTS

CN    106375934 A    2/2017
RU    2 604 858 C1   12/2016

OTHER PUBLICATIONS

Notification of Transmittal of the International Search Report and the Written Opinion cited in PCT/US2019/058404 dated Feb. 20, 2020, 18 pages.
(Continued)

*Primary Examiner* — Farid Seyedvosoghi
(74) *Attorney, Agent, or Firm* — Rothwell, Figg, Ernst & Manbeck, P.C.

(57) ABSTRACT

Methods and devices using a portable or wearable transistor configured to send an alert message to a personal security network. The personal security network comprises a platform by which users can select an appropriate alert response to a particular social interaction or event. The portable or wearable device comprises an electronics package with radio frequency communication capabilities, so that a user may discreetly and quickly escape from an unsafe or uncomfortable situation, by, for instance, sending out an alert
(Continued)

message or causing her mobile phone to ring so that she has a means to excuse herself from the scene.

7 Claims, 18 Drawing Sheets

(51) Int. Cl.
   *H04W 4/12*   (2009.01)
   *H04W 4/02*   (2018.01)
   *H04W 4/90*   (2018.01)
(52) U.S. Cl.
   CPC ........ *H04M 2203/306* (2013.01); *H04W 4/02* (2013.01); *H04W 4/90* (2018.02)
(58) Field of Classification Search
   CPC ..... H04M 2203/306; H04M 2203/652; H04M 2242/04; H04W 4/12; H04W 4/02; H04W 4/90; H04W 4/80; H04W 84/18; G08B 25/016
   See application file for complete search history.

(56) References Cited

U.S. PATENT DOCUMENTS

| | | | |
|---|---|---|---|
| 10,299,103 | B2 | 5/2019 | Hamilton et al. |
| 2005/0075116 | A1* | 4/2005 | Laird .................... A61B 5/1117 |
| | | | 455/414.1 |
| 2012/0315880 | A1 | 12/2012 | Peitrow et al. |
| 2014/0245789 | A1 | 9/2014 | Proud et al. |
| 2014/0289644 | A1 | 9/2014 | Clarke et al. |
| 2014/0368601 | A1* | 12/2014 | deCharms .............. H04N 7/148 |
| | | | 348/14.02 |
| 2018/0124588 | A1* | 5/2018 | Tropper ................ H04W 76/50 |
| 2019/0020991 | A1* | 1/2019 | Hamilton .............. H04W 4/025 |

OTHER PUBLICATIONS

European Communication issued in corresponding European Application No. Application 19880384.3, dated Jul. 14, 2022, 1 page.
Extended European Search Report issued in corresponding European Application No. Application 19880384.3, dated Jun. 27, 2022, 9 pages.

* cited by examiner

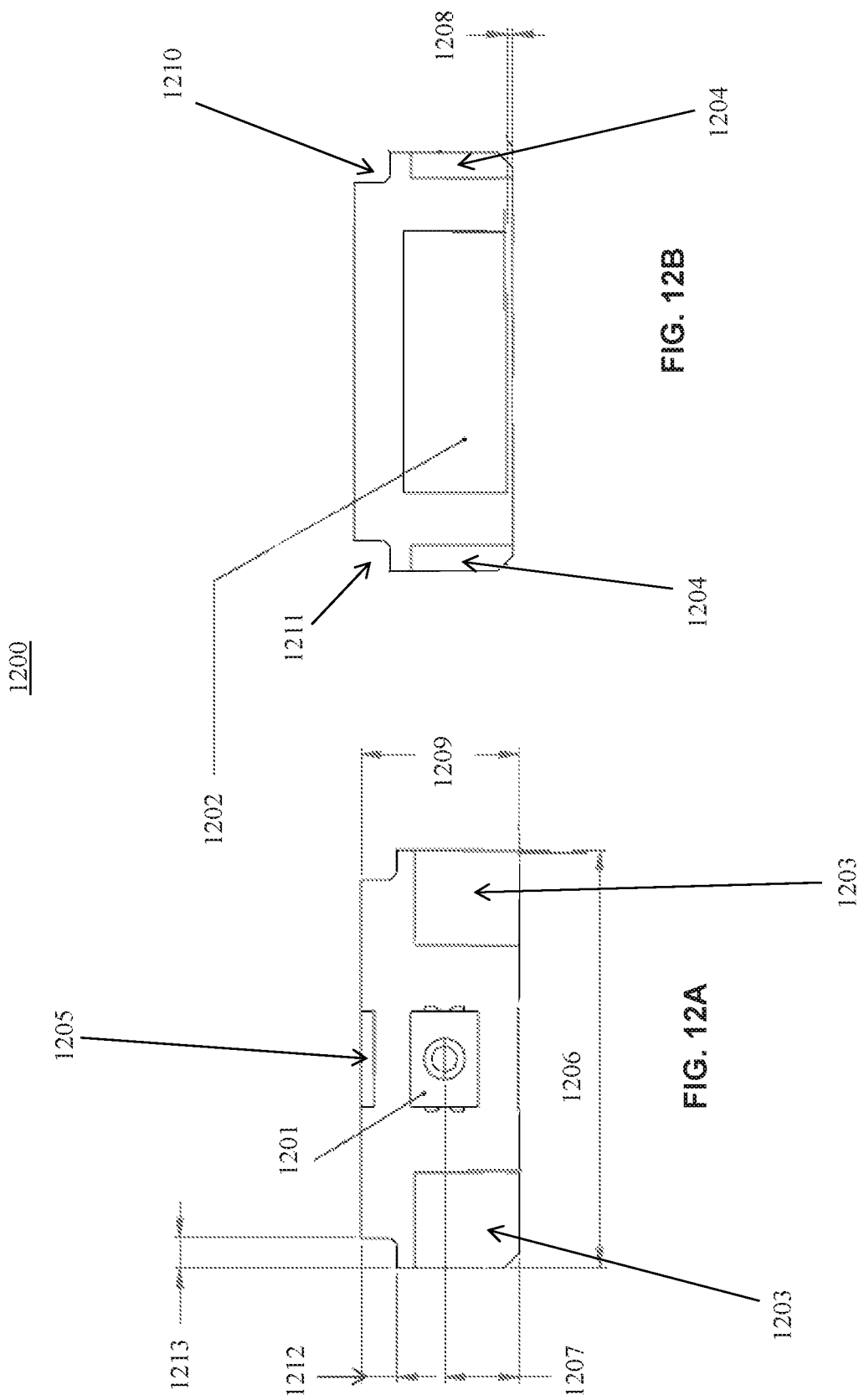

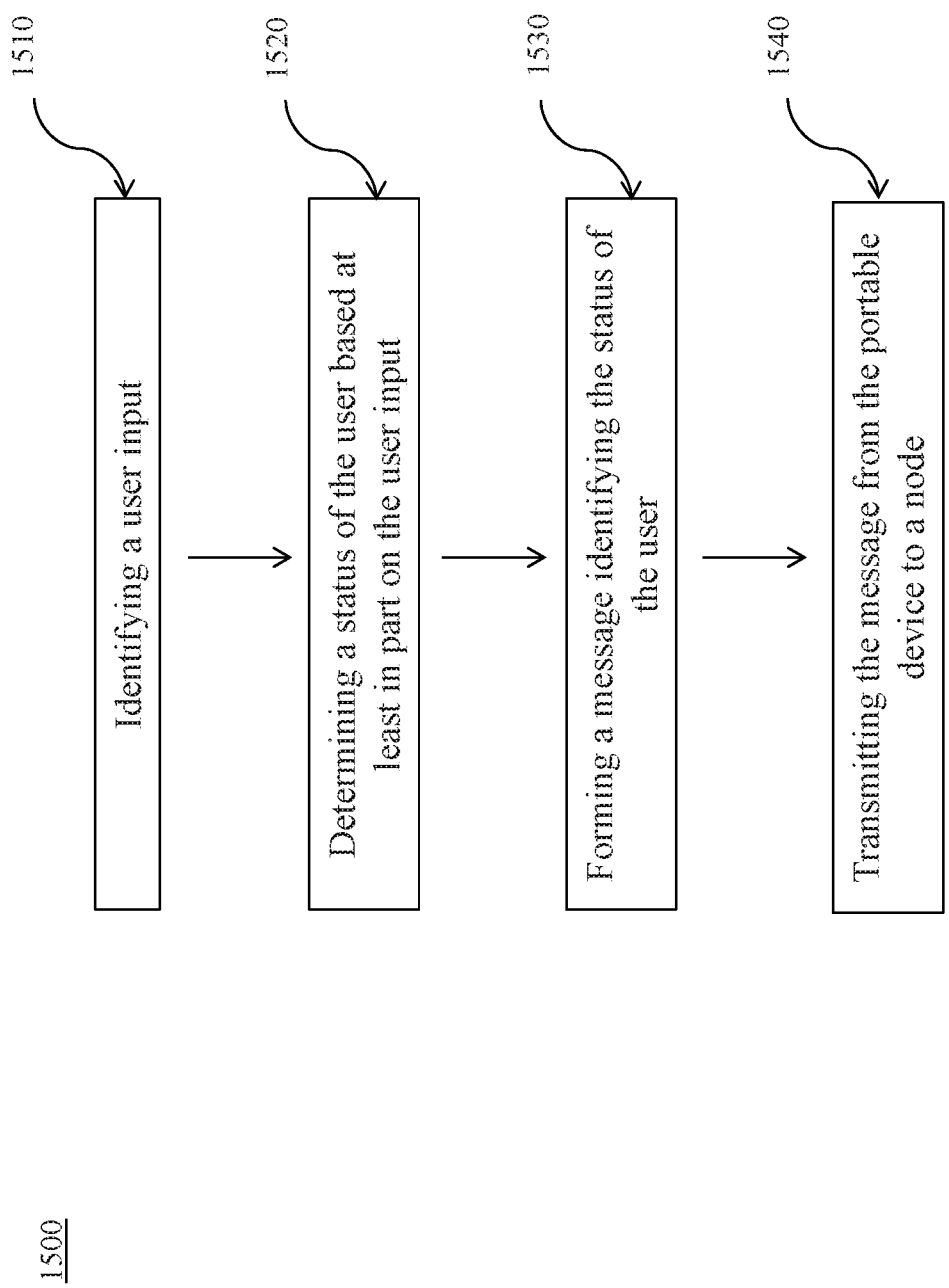

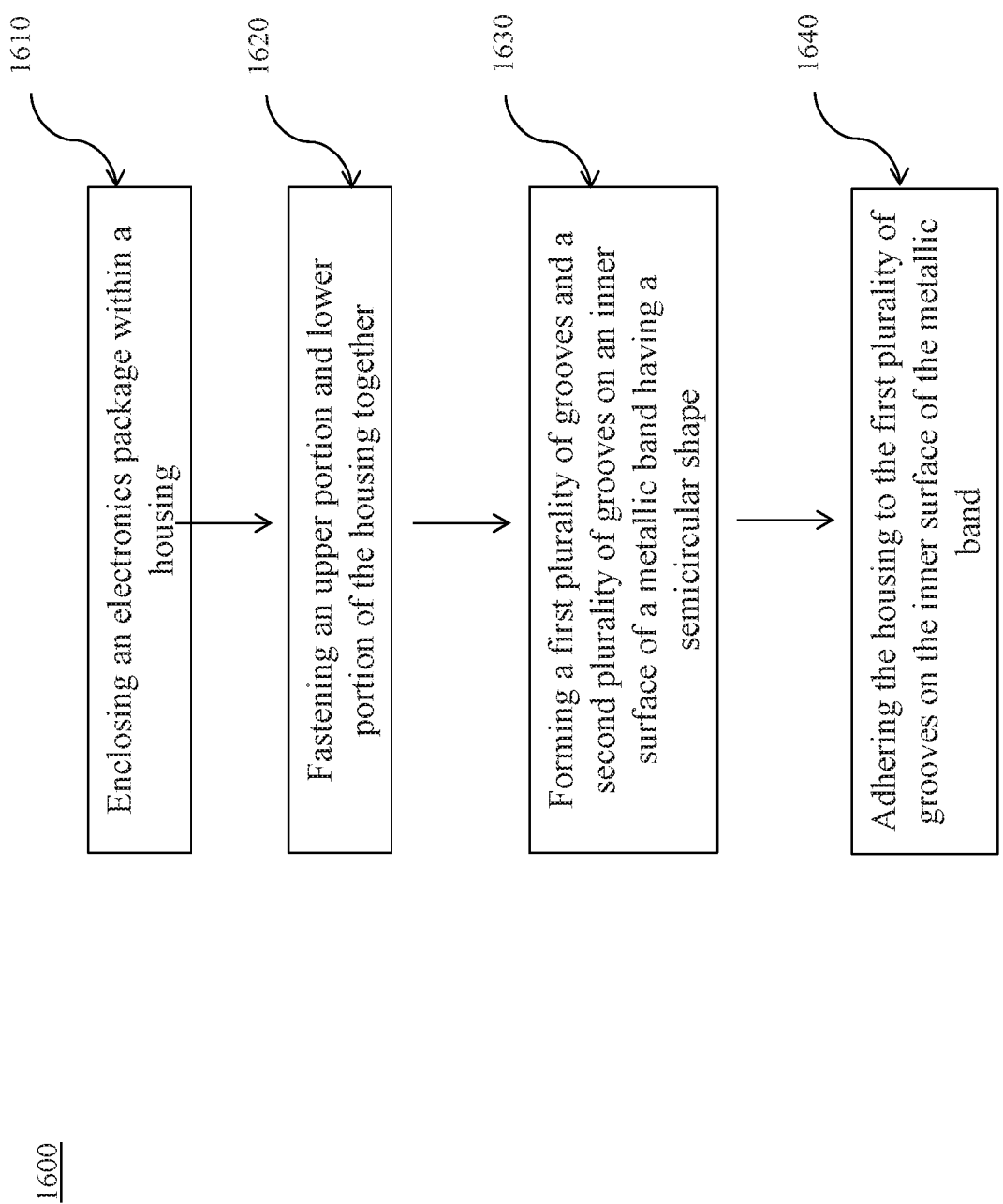

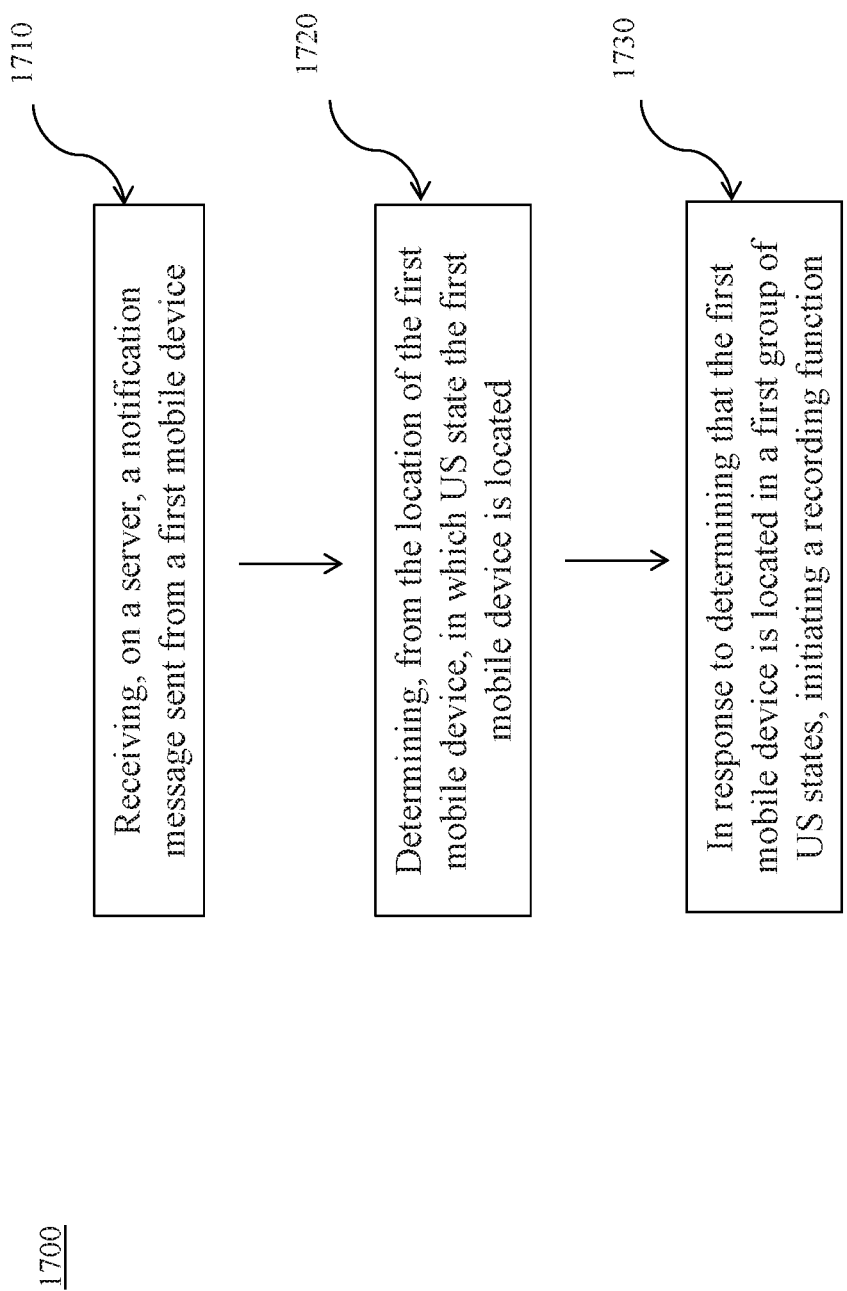

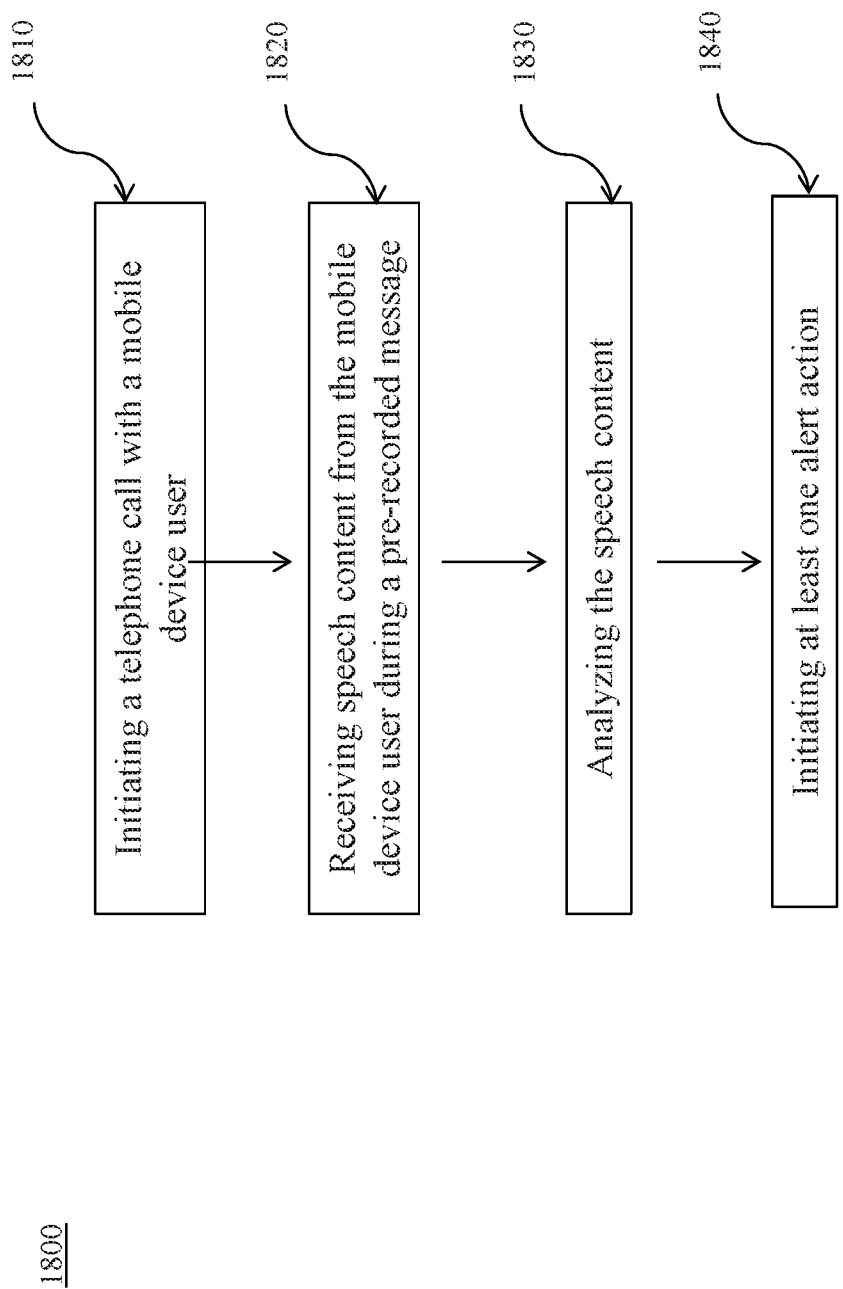

METHODS AND DEVICES FOR MESSAGING WITHIN A PERSONAL SECURITY NETWORK

CROSS REFERENCE TO RELATED APPLICATION

This application is a 35 U.S.C. 371 National Phase Entry Application from PCT/US2019/058404 filed Oct. 28, 2019, which claims the benefit of U.S. Provisional Patent Application No. 62/752,106 filed on Oct. 29, 2018, the disclosures of which are incorporated by reference in their entirety.

TECHNICAL FIELD

The present disclosure relates generally to a personal security network, and more particularly, to a portable device or a wearable device for communicating with a wireless node and a server, and methods for sending alerts and messages therebetween.

BACKGROUND

Personal security is an evolving concern. While random attacks still occur, current statistics reveal that the strong majority of victims of sexual assault knew their assaulter (i.e., a boyfriend, an ex-boyfriend, a classmate, a friend, an acquaintance, a date, or a coworker). Thus, the tools currently available to protect victims, such as mace, pepper spray, personal alarm buttons, and whistles, are bulky and inconvenient, and are often not appropriate for many social scenarios in which the user simply needs to escape from an uncomfortable situation. In addition, these tools are regularly left at home or are otherwise not readily accessible when needed.

Although mobile phones may be used to call for help, a person being attacked may not have time to reach for the mobile phone, access their contacts list, and then dial the number of a friend or family member or send a text message. While emergency services may be available on many mobile phones, even when locked, utilizing this feature still requires that the mobile phone be in the immediate vicinity of the user and that the user execute careful and deliberate actions on the phone while under distress. Furthermore, even where the person is not under attack, and is just seeking to exit an unsafe or uncomfortable scenario, using a mobile phone may be apparent to others, and potentially draw further unwanted attention towards the person trying to escape or even escalate the scenario to a point of danger.

Accordingly, a need exists for a wearable or otherwise portable device that is immediately accessible and allows a user to discreetly and quickly send an alert communication within a personal security network, or otherwise make a subtle escape from an uncomfortable situation. There is a need for a personal security network that provides an escape from a full spectrum of scenarios, from awkward conversations and bad dates to serious threats of immediate physical harm.

SUMMARY

Aspects of the disclosure provide a portable or wearable device that is configured to communicate with a wireless node and a server for connecting a user to a personal security network. The personal security network comprises a platform by which users can select an appropriate alert response to a particular social interaction or event. The portable or wearable device comprises an electronics package with radio frequency communication capabilities, so that a user may discreetly and quickly escape from an unsafe or uncomfortable situation, by, for instance, sending out an alert message or causing her mobile phone to ring so that she has a means to excuse herself from the scene. In some embodiments, the electronics package is arranged so as to be not visible from a top view of the portable or wearable device. In some embodiments, the electronics package is fully covered by the portable or wearable device, such that is does not extend beyond the boundaries of the portable or wearable device and is not easily viewed by others.

According to some embodiments, there is provided a portable electronic device having an antenna and an electronics package coupled to a first surface of the antenna. The electronics package comprises a radio frequency communication device, such as a Bluetooth transmitter, and may also comprise one or more batteries. In some embodiments, the one or more batteries may be located outside of the electronics package, for instance, a first battery may be located at a first distal end of the antenna and a second battery may be located at a second distal end of the antenna. The first and second batteries are electrically connected to the electronics package, which in some embodiments, is mounted at the center of the antenna. According to some embodiments, the antenna is a metallic band having a semicircular shape. In some embodiments, the metallic band comprises at least one of brass, white metal, white metal alloys, bronze, and stainless steel. In some embodiments, the metallic band is plated, wherein the plating material may comprise at least one of silver, gold, rose gold, imitation silver, imitation gold, imitation rose gold, and black plating. A first surface of the metallic band is an inner surface and a second surface of the metallic band is an outer surface. In certain aspects, the electronics package, inner surface, and/or outer surface of the metallic band may act as a resonance cavity for the reflection and redistribution of radio frequency signals transmitted by the radio frequency communication device. In some embodiments, the metallic band operates as an active antenna, which may include either proximity coupling or direct electrical connections between the electronics package and the metallic band. In other embodiments, the package enables the use of a wearable band as an antenna without a direct (e.g., wired) electrical connection between a transmitter of the electronics package and the band/antenna, such that the metallic band operates, for instance, as a passive antenna. In some embodiments, the electronics package is arranged so as to be not visible from a top view of the antenna. In some embodiments, the electronics package is fully covered by the band or by the antenna, such that is does not extend beyond the boundaries of the band or antenna and is not easily viewed by others.

According to some embodiments, the electronics package is configured to send a non-connected Bluetooth beacon signal to a wireless node, such as a cellular phone, smart phone, tablet computer, or personal assistance device. According to some embodiments, the antenna is configured to radiate radio frequency signals in an omnidirectional pattern. For instance, the antenna may have a resonant or operating frequency of approximately 2.4 GHz (e.g., in the range of 2.4 GHz to 2.4835 GHz), and have a dimension between 30 mm and 40 mm. The antenna may be configured to transmit a Bluetooth signal in that frequency range.

According to some embodiments, at least the first or second surface of the antenna has a geometric or fractal pattern, such as repeated "F" shapes, or is configured as a planar inverted-f antenna or a dipole antenna. In some embodiments, the electronics package is physically coupled to the antenna without a direct electrical connection. In other embodiments, the antenna is provided with waveguides running lengthwise along the metallic band. In some embodiments, the waveguides are made of a dielectric material and are spaced apart so as to enable the antenna to operate at a wavelength of approximately 2.4 GHz. According to some embodiments, the antenna is wearable, such as a bracelet.

According to some embodiments, a method of manufacturing the foregoing device is also provided.

According to some embodiments, a method of operating the foregoing device, including actuating a button on the device, causing a signal to be sent from the device indicating a status of a user of the device, is also provided.

In another aspect of the disclosure, there is provided a support structure for a wearable communication device including a band, where the band has an inner surface and an outer surface. This structure may be used, for instance, as an antenna as discussed above.

According to embodiments, the inner surface of the band has a first plurality of grooves and a second plurality of grooves. According to some embodiments, the first plurality of grooves are arranged lengthwise along the band and are configured to improve adhesion of an electronics package to the inner surface of the band. The grooves may, for instance, increase a bonding surface between the band's surface and an electronics package. This may include the use of an adhesive. In certain aspects, the second plurality of grooves may be arranged transversely along the band and are spaced apart so as to accommodate the electronics package therebetween. In some aspects, the second plurality of grooves comprises at least one groove on either side of the first plurality of grooves.

The support structure may also comprise an electronics package having a radio frequency communication device. In some embodiments, the electronics package is enclosed within a housing comprising an upper portion and a lower portion, with the upper portion having an inside surface and an outside surface. The outside surface of the upper portion of the housing has a set of channels that engage with the first plurality of grooves on the inner surface of the band. According to some embodiments, the electronics package is adhered to the band with an adhesive disposed in one or more of the first plurality of grooves. In some embodiments, the band is metallic and is formed in a semicircular shape. In some embodiments, the band comprises at least one of brass, white metal, white metal alloys, bronze, and stainless steel. In some embodiments, the band is plated, wherein the plating material may comprise at least one of silver, gold, rose gold, imitation silver, imitation gold, imitation rose gold, and black plating. The band may further include a first battery mount located at a first distal end of the band and a second battery mount located at a second distal end of the band. In some embodiments, the electronics package is arranged so as to be not visible from a top view of the band. In some embodiments, the electronics package is fully covered by the band, such that is does not extend beyond the boundaries of the band and is not easily viewed by others.

According to some embodiments, a method of manufacturing the foregoing support structure is also provided.

According to embodiments, a method of manufacturing a wearable device is provided, comprising the following steps: enclosing an electronics package within a housing, wherein the housing comprises an upper portion and a lower portion, and wherein an outside surface of the upper portion of the housing comprises a set of channels; fastening the upper portion and lower portion of the housing together; forming a first plurality of grooves and a second plurality of grooves on an inner surface of a metallic band having a semicircular shape; and adhering the housing to the first plurality of grooves on the inner surface of the metallic band. The first plurality of grooves improves adhesion of the electronics package to the inner surface of the metallic band, and the second plurality of grooves are spaced apart so as to accommodate the electronics package therebetween. In some embodiments, the first plurality of grooves are formed lengthwise along a center portion of the inner surface of the metallic band and the second plurality of grooves are formed along a width of the inner surface of the metallic band, with at least one groove on either side of the first plurality of grooves. According to some embodiments, adhering the housing to the first plurality of grooves on the inner surface of the metallic band comprises applying glue to the first plurality of grooves and pressing the housing to the inner surface of the metallic band, such that the set of channels on the outside surface of the upper portion of the housing engage with the first plurality of grooves on the inner surface of the metallic band.

In another aspect of the disclosure, there is provided a wearable accessory comprising an electronics package, a band, and a first battery and a second battery. The band comprises a main body having an inner surface configured to be worn against the wrist of a user, an outer surface opposite the inner surface, and first and second distal ends. The first battery is located at the first distal end and the second battery is located at the second distal end. The electronics package is electrically connected to the first and second batteries. The electronics package also comprises a radio frequency communication device configured to transmit a signal, such as a Bluetooth low energy beacon, indicative of a status of a user of the accessory. According to some embodiments, the electronics package is adhered to the inner surface of the main body of the band, and may be located equidistant from each of the first and second distal ends. In some embodiments, the band is a semi-rigid metallic band.

According to embodiments, there is provided a communication method in a portable device comprising: identifying a user input; determining a status of the user based at least in part on the user input; forming a message identifying the status of the user; and transmitting the message from the portable device to a node, wherein the portable device and the node are in a non-connected state. Determining a status of the user may comprise determining a button press time, wherein the user input indicates a first user status for a button press time less than or equal to a first time period (e.g., 2-4 seconds) and wherein the user input indicates a second user status for a button press time greater than the first time period. The user input may indicate a third user status for a button press time greater than or equal to a second time period (e.g., 5 seconds). According to other embodiments, the determining a status of the user may comprise at least one of determining a number of button presses, determining a button press time, determining a button press frequency, and determining the time between button presses. According to some embodiments, the message is a Bluetooth low energy (BLE) beacon, and forming the message comprises writing a message comprising one or more of Nonce, device type, a device ID, UUID, RSSI, and the user status, wherein the user status is the determined status of the user. In some embodiments transmitting comprises transmitting the message at least 10 times, or transmitting the message every 100 milliseconds for 2 seconds.

In some embodiments, transmitting comprises transmitting the message for a duration of about 2 to 10 seconds for up to a few milliseconds after the user presses the button. In some embodiments, the beacon is transmitted at industry-standard Bluetooth frequencies between 2.400 and 2.4835 GHz. The method may further comprise initiating a heartbeat timer.

According to some embodiments, the method further comprises the steps of: identifying a second user input; determining that the second user input indicates an override status; and, in response to determining that the second user input indicates an override status, sending a second message. The override status may be an emergency status of the user, and sending the second message may comprise one or more of entering into a connected state with the node, sending the second message over a WiFi network, and sending the second message over a cellular network. The method may further comprise entering a high power mode to override the non-connected state and provide an alternative signal to the Bluetooth low energy beacon. In some embodiments, determining that the second user input indicates an override status comprises determining that a button press time is equal to or exceeds a predetermined threshold. According to some embodiments, the method further comprises receiving a telephone call that is responsive to the message. The telephone call may comprise a pre-recorded message, a real-time computer assisted series of statements, or a real person speaking in response to the message.

According to some embodiments, there is provided a device comprising a band adapted to be worn by a user, and a processor configured to perform the foregoing steps, wherein the processor is mounted on the band. The device may also comprise an actuator.

According to embodiments, there is provided a portable device comprising a radio frequency communication device and a button, wherein the radio frequency communication device is configured to transmit a Bluetooth low energy beacon to a mobile device based on a user's actuation of the button, and wherein the beacon indicates a status of the user. In some embodiments, the mobile device is a cellular phone, a wireless node, or a computer, and the portable device is a bracelet, such as a tech-enabled or smart bracelet with an electronics package adhered to an inside surface thereof. According to some embodiments, the radio frequency communication device is adapted to, in response to an actuation of the button on the portable device, set a Bluetooth payload field to at least one condition, wherein the at least one condition is indicative of a user's state. In some embodiments, the Bluetooth payload field is set to a first condition or a second condition, wherein the first condition or second condition is indicative of the user's state.

According to some embodiments, a server is provided to receive and process signals transmitted in accordance with the foregoing.

BRIEF DESCRIPTION OF THE DRAWINGS

The accompanying drawings, which are incorporated herein and form part of the specification, illustrate various embodiments.

FIGS. 12A and 12B are drawings of a Bluetooth module configuration within an electronics enclosure according to some embodiments.

FIG. 15 is a communication method in a portable device according to some embodiments.

FIG. 16 is a method of manufacturing a wearable device according to some embodiments.

FIG. 17 is a method for recording mobile device activity according to some embodiments.

FIG. 18 is a method for escalating an alert response for a mobile device user according to some embodiments.

DETAILED DESCRIPTION

Figure 1:
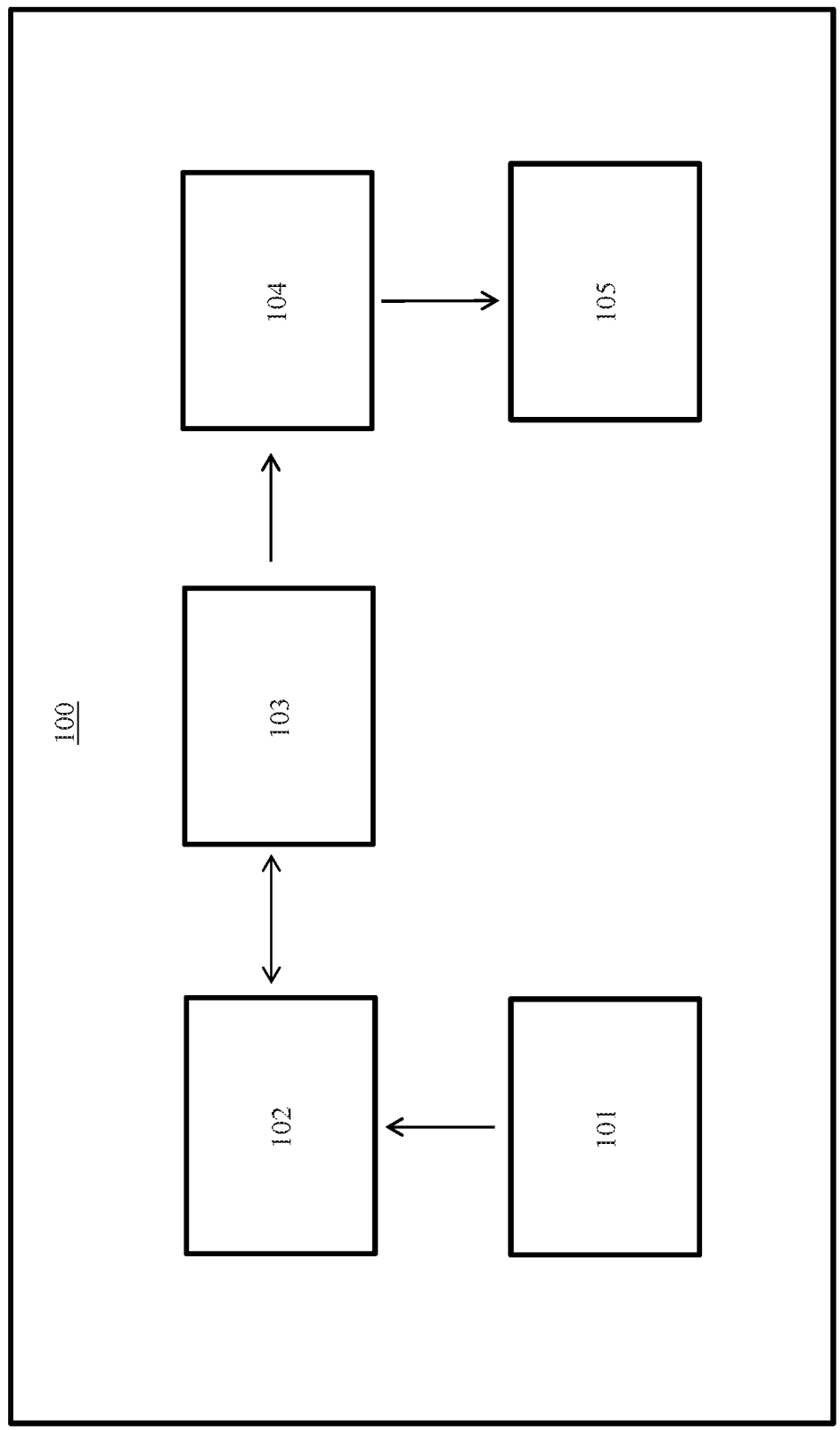
FIG. 1 is a signal block diagram illustrating a personal security network system according to some embodiments.

FIG. 1 illustrates a personal security network system 100 according to some embodiments. The system 100 may include a user 101, a portable or wearable device 102, a mobile device 103, which may comprise an application executing software, a server 104, and a communications platform 105, wherein the communications platform is configured to initiate at least one alert action.

When the user 101 presses a button on the portable or wearable device 102, the hardware within the portable or wearable device 102 emits a series of signals, such as Bluetooth Low Energy (BLE) beacons. Portable devices include those devices that may be carried or easily moved by the user 101. Portable devices may include wearable devices that are worn by the user 101 or are otherwise on the user's person. In some embodiments, the portable or wearable device 102 may be jewelry. Jewelry may include, for example, a bracelet (e.g., a cuff bracelet or a beaded bracelet), anklet, ring, necklace, earring, body chain, piercings, pin, or the like. In some embodiments, the portable or wearable device 102 may be an accessory. Accessories may include, for example, a belt, watch, brooch, wristband, suspenders, fitness tracker, sweatband, headband, tie clip, button, glasses, sunglasses, umbrella, wallet, cane, handbags, purses, wristlets, keychain, bindi, or the like. In some embodiments, the portable or wearable device 102 may be a clip-on or module piece of an article of clothing, to be attached to or integrated within an article of clothing, such as a hat, zipper, scarf, shoelace, bra, collar, belt, or the like.

A mobile device 103 listens for the beacons emitted by the device 102, and when they arrive, the mobile device 103, via a mobile application with application executing software, decides how to handle the user's button press or presses. The mobile device 103 may be a cell phone, a smart phone or smart device, a tablet computer, a laptop computer, a GPS device, a personal digital assistant (PDA), handheld personal computer, pager, e-reader device, a smart watch, secondary wearable device, or the like. In some embodiments, the mobile device 103 may look for short presses (e.g., tapping the button) and long presses (e.g., holding for longer than about 2 seconds). The mobile device 103 may also identify patterns such as multiple consecutive short presses or a combination of short and long presses, which may include determining the number of times the button was pressed, the length of time of each button press (e.g., how long the user pressed the button before each release), and the length of time between presses (or frequency of presses), in a manner similar to Morse Code.

The mobile device 103 may act on those button presses in a number of ways. In some embodiments, the user may customize the desired response or alert action via user input within the mobile application. In some embodiments, the mobile device 103 extracts enough data from the beacon to communicate to a server 104 the type of button press or combination of button presses that occurred and for which specific portable or wearable device 102. The mobile device 103 may communicate with the server 104 over a network to transmit the information collected from one or more beacons. The network may include a wireless network, such as a wireless telephone network (e.g., a WiFi network), a Bluetooth® network, an ANT+™ wireless connection, a pager network, or a near field communication connection. The network may further include a wide area network (WAN), a storage area network (SAN), a local area network (LAN), an optical fiber network, the internet, or the like. The server 104 may comprise an application program interface (API) that can identify the owner of the portable or wearable device 102 that emitted the beacon.

The server 104 may communicate with a communications platform 105 to initiate at least one alert action. In some embodiments, the alert action may comprise at least one of the following: (1) initiating a phone call to the user's mobile device; (2) relaying a message to a predefined contact, set of contacts, nearby network users, or a customized segment of network users, wherein the message comprises information about the user's status (e.g., location) or an indication of a change of status; (3) contacting emergency services (e.g., the police, campus security, a neighborhood watch, emergency medical services, a hospital or other healthcare service, a shelter or rescue organization, firefighters, or the like); (4) contacting a transportation service (e.g., Uber, Lyft, Via, or the like); (5) activating an audio or video recording; (6) triggering an audible alarm; (7) activating a voice recognition software; (8) posting a message to a social media account; (9) opening a garage; (10) unlocking or locking a door; (11) starting a vehicle; (12) requesting tips in real-time from an automated or AI service; and (13) indicating if a user has made it home safely or if they have left a predefined area.

In one configuration, the user 101 quickly presses or taps the button on the portable or wearable device 102 to initiate a phone call to the user's mobile device 103 or another cell phone. In another configuration, the user 101 holds the button for a predetermined length of time to request backup from the friends and family they've identified as their "crew" (e.g., a predefined set of contacts).

According to embodiments, a configuration can change dynamically. For instance, the same beacon types can be interpreted differently by the mobile application on the mobile device 103 or on the server 104. User profiles may be created in the mobile app where the user 101 can program what he or she would like a button press to do and can customize the desired alert action(s). The mobile device 103 can suggest different options after asking the user 101 a series of questions about his or her lifestyle and needs. For example, if a user 101 answers questions via user input about her lifestyle and indicates that she has safety concerns when driving home at night and entering her house alone, the mobile device 103 can communicate with the server 104 and communications platform 105 to tell the user's home automation system to open the garage door when she presses the button on her wearable device 102.

According to embodiments, there is provided a method for customizing the communication between a user 101, a wearable or portable device 102 comprising an electronics package, a wireless node such as a mobile device 103, a server 104, and a communications platform 105, wherein the method comprises the steps of: creating a user profile in a mobile application via an interface module, wherein the interface module comprises a user-programmable memory and a user interface; selecting a series of user preferences on the user interface; and configuring the communication between the electronics package within the wearable or portable device 102, the wireless node or mobile device 103, the server 104, and the communications platform 105 according to the stored user preferences. As described above, selecting a series of user preferences on the user interface may comprise answering a series of prompts regarding user lifestyle, needs, concerns, location, age, ability, desired security, and the like.

While the same beacon may be interpreted differently according to customizations in an application, in some embodiments, the portable or wearable device 102 can enter a 2-way communication state such that customization can be communicated from the mobile application on the mobile device 103 to the wearable device 102. This may adjust, for example, the manner in which the wearable device 102 forms a Bluetooth message in response to a particular button press or hold, or combination of button presses.

In certain aspects, the mobile device 103 can communicate with the server 104 and the communications platform 105 to, for instance, call campus security, post to twitter, or tell third-party home automation systems to lock the doors. By way of non-limiting example: in-home nurse aides might want the first button to transmit their location to their managers during working hours; residents in retirement communities might want the first button to tell support staff where they are; young adults might want to press the button to tell their friends that they've found the best party. In some embodiments, the configurations can be changed dynamically at any time on the server 104 or on the mobile application on the mobile device 103. Different apps that are tied to specific configurations, such as a campus security app, a party finding app, or a retirement home assistance app, may also be deployed. Thus, the user 101 may also be able to customize the desired response or alert action in response to different types of button presses, such as initiating a phone call on a mobile device, sending a text message to a predefined set of contacts, producing an audible alarm, or sending out a communication to an emergency service or a particular customer segment network.

In some embodiments, the way that the button works may change as a function of time and location. For instance, the user 101 may choose to have the button send their location to their manager during the day, but then revert to a safety configuration at night. The configuration may also change based on events entered into the users' online calendars.

Figure 5:
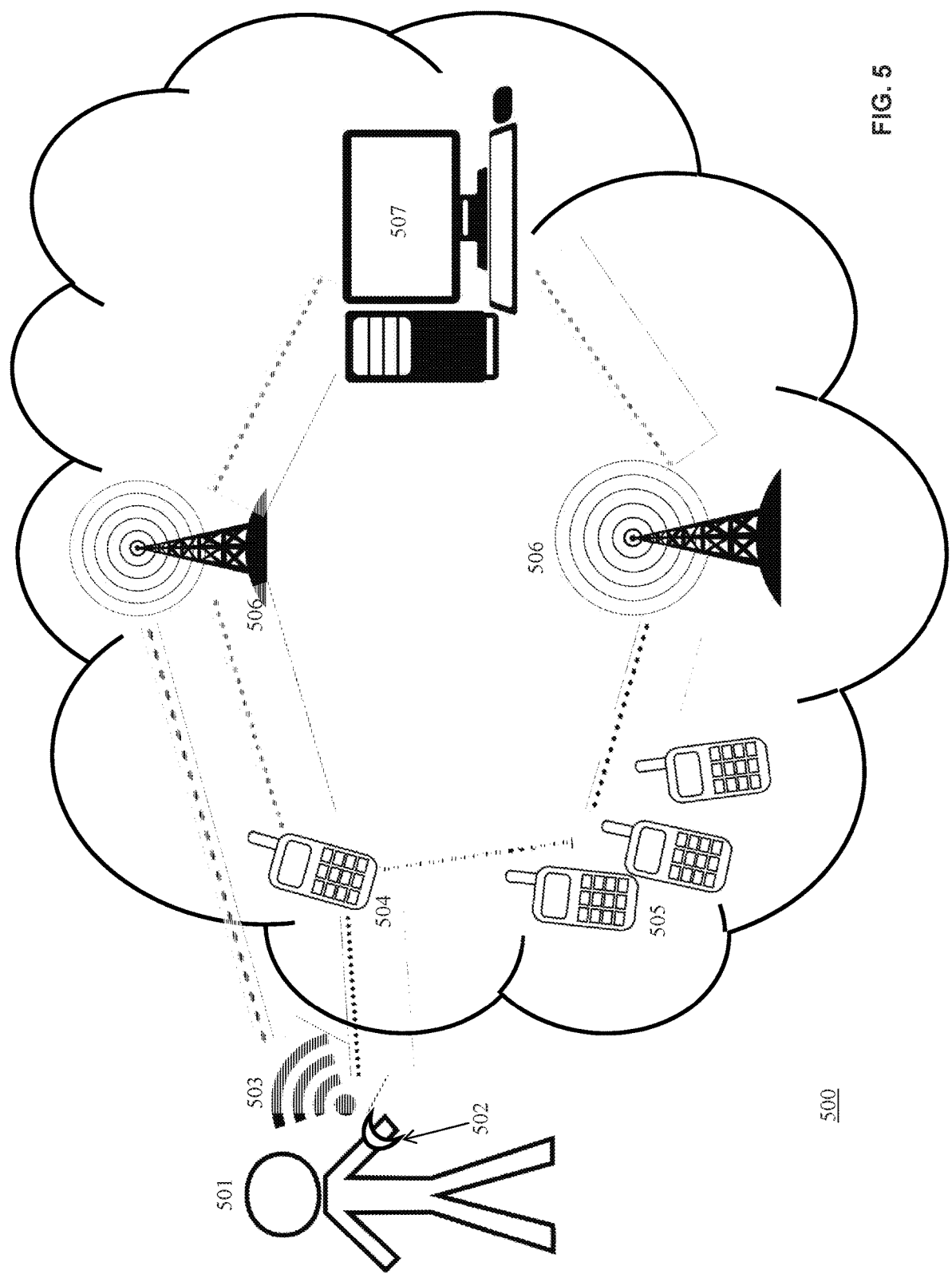
FIG. 5 is a diagram of a personal security network according to some embodiments.

According to embodiments, a user 101 does not need to pair their portable or wearable device 102 with their mobile device 103 to use the personal security network. In certain aspects, the personal security network uses non-connectable BLE beacons, in which the beacons may be transmitted to all nearby wireless nodes or receivers. In some cases, there is no personally identifiable information in any of the transmissions. Taking this approach may improve product reliability by increasing the chances that portable or wearable device transmissions are sent to the servers for handling. An example of this type of personal security network is described in detail below, and is shown in FIG. 5.

Figure 2:
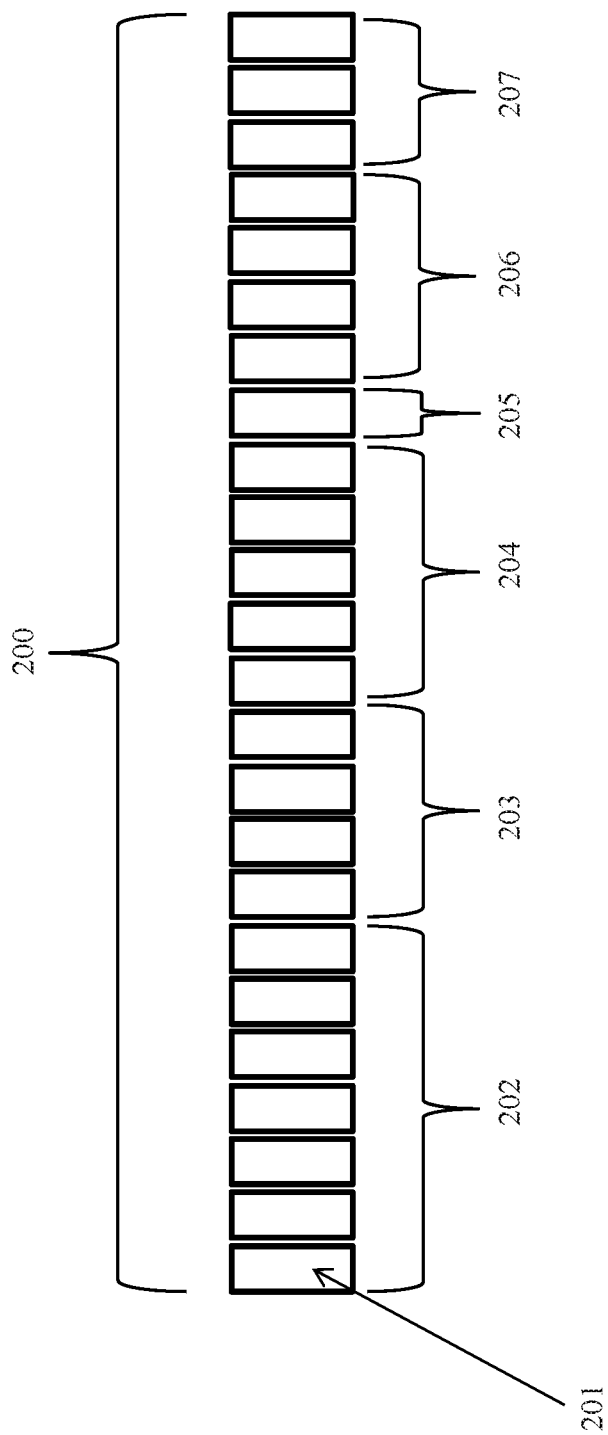
FIG. 2 is a diagram illustrating the contents of a beacon according to some embodiments.

A depiction of the contents of each beacon 200 transmitted within the personal security network system 100 according to some embodiments is set forth in FIG. 2. The beacon 200 may comprise a plurality of bytes 201. In some embodiments, the beacon 200 comprises twenty-four bytes 201. A first portion 202 of the beacon 200 may comprise at least one byte related to device ID, wherein the device ID is one of about 16 million values that uniquely identifies each wearable device in the personal security network. A second portion 203 of the beacon 200 may comprise at least one byte with a nonce, wherein the nonce is an arbitrary number that helps to distinguish consecutive beacons from the same device ID. A third portion 204 of the beacon 200 may comprise at least one byte related to a received signal strength indicator (RSSI), wherein the RSSI indicates an expected received signal strength at 1 meter. The mobile app may consider the RSSI when calculating the actual received signal strength. A fourth portion 205 of the beacon 200 may comprise at least one byte related to device type, wherein the device type indicates to receivers that this beacon uses the iBeacon format. A fifth portion 206 of the beacon may comprise at least one byte related to the universally unique identifier (UUID) of the wearable device, wherein the UUID comprises one of twenty values that identifies this beacon as part of the personal security network. Knowing these values in advance may allow for the mobile app register to receive the beacon even when it is not running on IOS. A sixth portion 207 of the beacon 200 may comprise at least one byte related to button press type, wherein the button press type distinguishes between short and long button presses, the frequency of presses, and the time in between presses. In some embodiments, the button press type may also encode the version number of the wearable device, which allows the mobile app to be able to interpret other fields in the payload. The ordering of the different portions of the beacon is not particularly limited and other configurations of the beacon portions are within the scope of this disclosure.

According to some embodiments, at least one beacon is transmitted per button press. In some embodiments, a plurality of beacons are transmitted per button press. In some embodiments, about 20 beacons are transmitted per button press (e.g., a transmission every 100 milliseconds for about 2 seconds). The beacons may be non-connectable beacons, such that pairing may not be required or even enabled.

Furthermore, in some embodiments, there may not be an established connection between the portable or wearable device 102 and the mobile device 103. The wearable device 102 may transmit beacons blindly and the mobile device 103 may listen for the beacons passively. When mobile device 103 detects beacons with the personal security network's UUIDs, it notifies the mobile app and passes the beacon payload data to the code in the server 104. Any number of mobile devices 103 can detect the same beacons.

Figure 3:
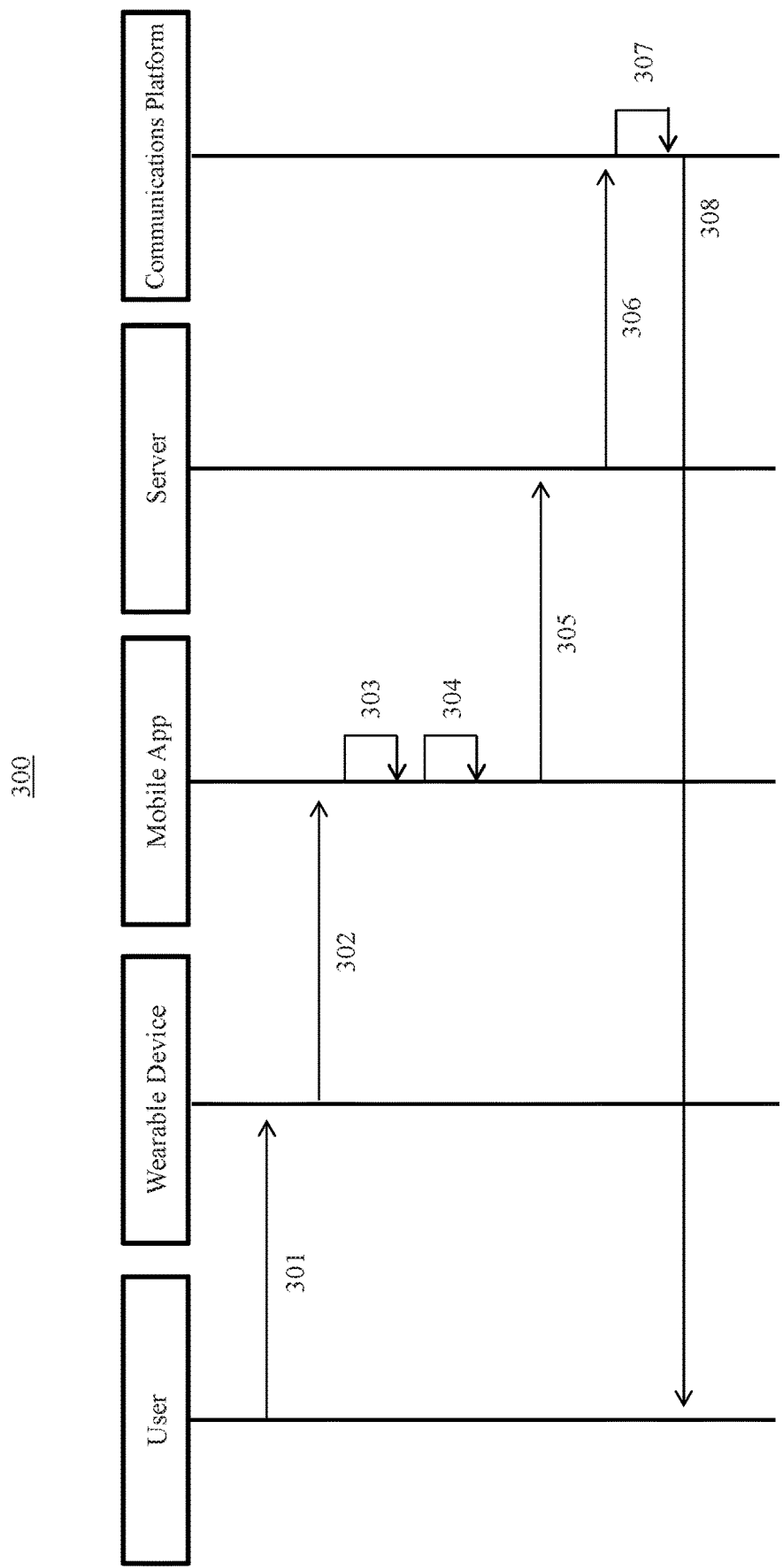
FIG. 3 is a signal flow chart illustrating a communication process according to some embodiments.

According to embodiments, after detecting beacons, the mobile app on the mobile device 103 fetches the current location and then passes the bundle of data to the server 104. The bundle of data may include: device ID, location of the mobile device 103 that detected the beacon, ID of the user 101 whose mobile device 103 detected the beacon, and the type of beacon detected. A diagram depicting a signal flow 300 for short and long button presses according to some embodiments is set forth in FIG. 3. At a step 301, the user initiates the signal flow by pressing a button on a wearable device. At a step 302, the wearable device transmits BLE beacons to a mobile app on a mobile device. At a step 303, the mobile app receives a BLE notification from an operating system. At a step 304, the mobile app determines a location of at least one of the user, the wearable device, and the mobile app. At a step 305, the mobile app communicates with the server and indicates a beacon type depending on the type of button press. At a step 306, the server utilizes a communications platform to initiate an action based on the received beacon type. In some embodiments, the communications platform comprises Twilio. At a step 307, the communications platform implements a program logic (e.g., TiML logic) based on the received beacon type. At a step 308, the communications platform initiates at least one alert action based on the beacon type. In some embodiments, the alert action may comprise at least one of the following: (1) initiating a phone call to the user's mobile device; (2) relaying a message to a predefined contact, set of contacts, nearby network users, or a customized segment of network users, wherein the message comprises information about the user's status (e.g., location) or an indication of a change of status; (3) contacting emergency services (e.g., the police, campus security, a neighborhood watch, emergency medical services, a hospital or other healthcare service, a shelter or rescue organization, firefighters, or the like); (4) contacting a transportation service (e.g., Uber, Lyft, Via, or the like); (5) activating an audio or video recording; (6) triggering an audible alarm; (7) activating a voice recognition software; (8) posting a message to a social media account; (9) opening a garage; (10) unlocking or locking a door; (11) starting a vehicle; (12) requesting tips in real-time from an automated or AI service; and (13) indicating if a user has made it home safely or if they have left a pre-defined area.

Figure 4:
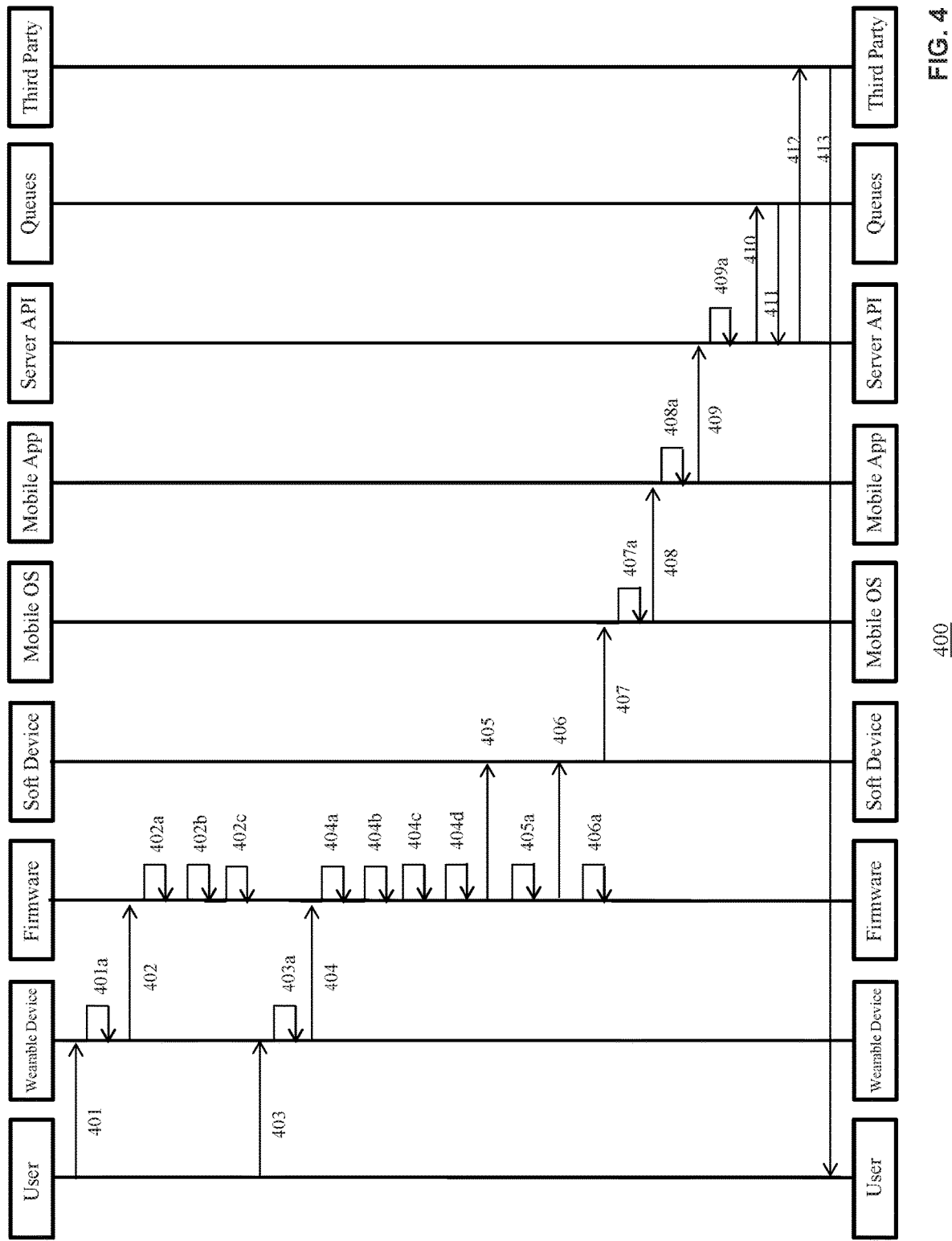
FIG. 4 is a signal flow chart illustrating a communication process according to some embodiments.

Another diagram of the signal flow and the communication steps between the separate nodes of the personal security network according to some embodiments is depicted in FIG. 4. The flow of FIG. 4 may be implemented, for instance, in the network described with respect to FIG. 1 and/or FIG. 5. A personal security network may comprise at least one of a user, a wearable device, firmware, soft device, a mobile device operating system (OS), a mobile app, a server API, queues, and a third party. At a step 401, the user presses a button on the wearable device. At a step 401a, the button shaft presses a switch on a printed circuit board (PCB) within the wearable device. At a step 402, a general purposes input/output (GPIO) pin within the wearable device changes state. At a step 402a, the firmware reads the GPIO pin state, and then at a step 402b, the firmware starts a button press timer. At a step 402c, the firmware stops a heartbeat timer. The heartbeat timer schedules transmission of beacons that are not associated with any user action. Beacons transmitted on this schedule are called "heartbeat" or "check-in" beacons and provide diagnostic data to gauge jewelry performance and product engagement. The button timer may have two purposes. First, the button timer measures the amount of time for which the user held the button down (e.g., to distinguish between button press types). Second, the button timer schedules the transmission of beacons associated with the user action. Beacons transmitted on this schedule have the same radio frequency characteristics as transmissions scheduled by the heartbeat timer. At a step 403, the user releases the button on the wearable device. At a step 403*a*, the button shaft then lifts away from the switch on the PCB. At a step 404, the GPIO pin within the wearable device then changes state again. At a step 404*a*, the firmware then reads the GPIO pin state. At a step 404*b*, the firmware communicates with the button press timer to determine whether the button press was a long button press (e.g., the button was pressed for a length of time of about 2 seconds or longer). If the button press was a long button press, the firmware sets the beacon type to long press; otherwise, the firmware sets the beacon type to short press. In some embodiments, the button press may be a combination button press, comprising a pattern of short and/or long presses. At a step 404*c*, the firmware then initiates a signal advertisement. At a step 404*d*, the firmware then selects the next UUID to transmit, and subsequently enters the UUID, beacon type, and device ID into a beacon payload and then starts an advertisement timer. At a step 405, the firmware communicates with a soft device to start advertising. At a step 405*a*, the advertisement timer is stopped, and at a step 406, the firmware stops advertising to the soft device. At a step 406*a*, the heartbeat timer is started. At a step 407, the soft device transmits the beacon, which is then received by the mobile device OS. At a step 407*a*, the mobile device OS determines whether there is an app subscription for the specific UUID in the beacon. In some embodiments, when there is an app subscription for the specific UUID in the beacon, at a step 408, the mobile device OS sends the detected beacon(s) to the mobile app. At a step 408*a*, the mobile app extracts at least one of the device ID, device version, beacon type, and nonce from the beacon(s). At a step 409, the mobile app transmits a beacon event to a server application programming interface (API). At a step 409*a*, the server API identifies the owner of the wearable device that emitted the beacon(s). At a step 410, the server API queues an action based on the identified beacon type. At a step 411, the server API subsequently dequeues the action based on beacon type, and at a step 412, communicates with a third party service to initiate at least one alert action. Finally, at a step 413, the alert action is initiated.

According to some embodiments, the personal security network system 100 has the ability to access real-time data on the user 101. For instance, through the interface module on the mobile application on the mobile device 103, the user 101 may provide the personal security network system 100 with access to their personal, social, and/or work calendars. For example, in some embodiments, when a user 101 presses the button on her portable or wearable device 102, the network may be able to access data to determine where the user 101 is located, what time it is, and what religious/cultural events are happening.

According to some embodiments, the personal security network system 100 may further collect information from a user 101 in the mobile app on the mobile device 103 about his or her lifestyle needs via data provided at registration (e.g., age, location, marital status, interests, etc.) and gamified questions (i.e., a prompt requesting the user to swipe left or right to indicate if at least one of the following is a situation the user may find herself in—awkward conversation, uncomfortable online date, bad hookup, had too much to drink, exploring an unknown part of your city, attending a party/bar/event where the user doesn't know anyone, music festival, etc.).

The information and data acquired about the user 101, through user input on the mobile app, access to the user's calendar, real-time data collection, etc., may be used to determine an appropriate response when an indication is received from a user 101 by the mobile device 103 and/or server 104. In some embodiments, the personal security network system 100 may combine any self-reported information with real-time data to provide a user with targeted and curated information that the user 101 may need in certain social situations. In other embodiments, the personal security network system may provide curated guidance that helps a user 101 navigate an uncomfortable situation.

For example, it may be Thanksgiving Day. The user 101 presses the button on the portable or wearable device 102 indicating that she needs help navigating this social situation. In some embodiments, the mobile device 103 and/or server 104 may be able to infer from the date and the user's calendar that the user 101 is at Thanksgiving dinner with her family. Via an app notification or text message, the server 104 may then transmit the beacon(s) to the communications platform 105, which may then initiate an appropriate alert response, such as providing the user 101 with the most sought-after information for Thanksgiving dinner. For instance, this information may comprise carefully curated content on how to diffuse or avoid a tense political discussion and prompts for fun and timely conversations that reflect users' interests. The information provided may be presented as tips and tricks for attending Thanksgiving dinner and ensuring she has a great time even if things get awkward. In some embodiments, the user 101 may also engage with the personal security network system without hitting any button on the portable or wearable device 102. That is, in some embodiments, the mobile app on the mobile device 103 may have the ability interpret key words in the user's speech, leveraging real-time and profile data to provide helpful prompts.

According to some embodiments, the personal security network system 100 may utilize connectionless signals (or advertisements) to announce user events to all nearby network-enabled smart electronic devices (phones, tablets, computers, smart TVs, smart watches, etc.). Any of those devices may receive and identify the network system beacons. Those that receive the beacons will attempt to send beacon payloads (with other contextual data) to the servers. In some instances, not all nearby devices running the mobile app will receive all beacons. However, according to some embodiments, the personal security network system 100 may only require a single phone or tablet, or some other wireless node, to receive the beacon(s) and transmit them to the server. This ultimately improves the effectiveness of the personal security network system 100, such that a user 101 will not be solely reliant on his or her own mobile device 102 to send and receive beacons.

Therefore, in certain aspects, there is provided an alert system for transmitting a signal from a user to a recipient comprising: a portable device coupled to an electronics package, a wireless node, and a server. In some embodiments, the electronics package comprises one or more of a printed circuit board, a radio frequency communication device, a microprocessor, and an actuator, wherein the radio frequency communication device is configured to communicate with and send BLE beacons to the wireless node, and wherein the wireless node is configured to communicate with the server. In some embodiments, the electronics package comprises a Nordic NRF52832 or NRF52810. In some embodiments, the radio frequency communication device may be configured to operate in either a connected or non-connected state. For instance, the receiving capabilities of a transceiver may be disabled, for example, to conserve battery resources.

In other aspects, the alert system may comprise a network of wireless nodes positioned within a community of users at a designated location. The wireless node may be at least one of a mobile device, a tablet computer, a personal assistant device, or a type of mini base station having a particularly strong wireless signal capability. The designated location may be a location where many users would congregate. For instance, in some embodiments, the designated location may be a concert venue, a campus, a dorm, an apartment or condominium building, a neighborhood, a party, a retirement community, a hospital, a nursing home, a place of occupation, a resort or hotel, a sports complex or stadium, or a place of worship. The wireless node may then send a notification message to the server, specifying the button press type, and at least one of Nonce, device type, a device ID, UUID, RSSI, and the user status. The server would then be able to take the appropriate action and send an appropriate alert response. A diagram depicting this type of alert system, wherein the wireless node can be the user's mobile device, another person's mobile device, or any other node in the vicinity of a group of users, is provided in FIG. 5.

As shown in FIG. 5, in some embodiments, the alert system 500 comprises a user 501, wherein the user 501 has a portable or wearable device 502 for communicating across the alert system 500. In some embodiments, the wearable device 502 may transmit a beacon over a wireless network 503. The wireless network 503 may comprise a wireless telephone network (e.g., a WiFi network), a Bluetooth® network, an ANT+™ wireless connection, a pager network, or a near field communication connection. The network may further include a wide area network (WAN), a storage area network (SAN), a local area network (LAN), an optical fiber network, the internet, or the like. In some embodiments, the beacon is received by the user's mobile phone 504 or one of group of surrounding mobile phones 505. In some embodiments, the beacon is then transmitted to a wireless node 506 and then sent to a server 507 to take the appropriate alert action depending on the beacon type. In some embodiments, the wearable device 502 transmits a beacon over a wireless network 503 directly to a wireless node 506, without going through a mobile phone.

Therefore, if the user's own mobile device doesn't have sufficient service or connection to receive the beacon, the beacon may be received by another type of wireless node in the adjacent vicinity. The presence of wireless nodes, such as mini base stations having a particularly strong wireless signal capability, within a large group of users, particularly ensures that the personal security network system will function properly and that the user will receive the personal security assistance that he or she needs.

According to some embodiments, for instance in a safety configuration, the personal security network system may initiate a call to a user in less than 3 seconds after the user presses the button on the portable or wearable device. A pre-recorded message that simulates one half of an intense conversation may then be played for the user upon answering the telephone call. A user may choose to respond to the pre-recorded dialogue by speaking back to that message as it plays to make it appear as though the user has a legitimate excuse for getting out of an uncomfortable situation. The mobile app software on the mobile device may then analyze what the user says in that conversation and communicate with the server and the communications platform to initiate an appropriate alert action. In addition to analyzing the words that a user speaks aloud, the mobile app may also analyze the emotional content detected in the user's speech. By combining that information and data with knowledge of the user's location and other profile information, the mobile app, server, and communications platform may be able to detect at least one keyword from the user's speech that triggers an alert event (or alert action) or initiates other request for backup.

According to some aspects, there may be at least two components in this implementation of the personal security network system. For instance, in some embodiments, the personal security network system's own signal processing may be configured to analyze the frequency content in a user's speech and classify the distribution as normal or distressed. Thus, a mobile application on the mobile device may comprise a CNN or similar AI that may recognize frequency distributions that indicate distress. In other embodiments, a third party system, such as Amazon's speech recognition and analysis API, may be used to extract keywords from the user's speech in response to the phone call and/or pre-recorded message.

Thus, according to another aspect of the disclosure, there is provided a method for escalating an alert response for a mobile device user comprising the steps of: initiating a telephone call with the mobile device user, wherein said telephone call comprises a pre-recorded voice message; receiving speech content from the mobile device user during the pre-recorded message; analyzing the speech content; and, based at least in part on the analyzing, initiating at least one alert action. In some embodiments, the alert action may comprise at least one of the following: (1) initiating a phone call to the user's mobile device; (2) relaying a message to a predefined contact, set of contacts, nearby network users, or a customized segment of network users, wherein the message comprises information about the user's status (e.g., location) or an indication of a change of status; (3) contacting emergency services (e.g., the police, campus security, a neighborhood watch, emergency medical services, a hospital or other healthcare service, a shelter or rescue organization, firefighters, or the like); (4) contacting a transportation service (e.g., Uber, Lyft, Via, or the like); (5) activating an audio or video recording; (6) triggering an audible alarm; (7) activating a voice recognition software; (8) posting a message to a social media account; (9) opening a garage; (10) unlocking or locking a door; (11) starting a vehicle; (12) requesting tips in real-time from an automated or AI service; and (13) indicating if a user has made it home safely or if they have left a pre-defined area. The analyzing step may comprise identifying a trigger keyword associated with the user, wherein the trigger keyword indicates that the user is in distress. In some embodiments, the analyzing step further comprises analyzing one or more of the frequency and content of speech and classifying the speech as either normal or distressed. The speech content may comprise the mobile device user's natural language in response to the pre-recorded voice message. The mobile device may be a cellular phone, smart phone, tablet computer, personal assistant device, or the like, wherein the mobile device is configured to receive Bluetooth beacons from an electronics package on a wearable device.

In some embodiments, the user may also be able to initiate a recording feature on the mobile phone, and either store the recorded event or send it to a contact or emergency service. However, the user will only be able to activate this recording feature in a state that does not require all parties to a conversation to consent to the recording.

Thus, in yet another aspect of the disclosure, there is provided a method for recording mobile device activity comprising the steps of: receiving, on a server, a notification message sent from a first mobile device, wherein the notification message comprises a location of the first mobile device; determining from the location of the first mobile device, in which US state the first mobile device is located, wherein a first group of US states comprises one-party consent states and wherein a second group of US states comprises two-party consent states; and, in response to determining that the first mobile device is located in the first group of US states, initiating a recording function. The method may further comprise: receiving, on a server, a notification message sent from a second mobile device, wherein the notification message comprises a location of the second mobile device; determining, from the location of the second mobile device, in which US state the second mobile device is located, wherein a first group of US states comprises one-party consent states and wherein a second group of US states comprises two-party consent states; and, in response to determining that the second mobile device is located in the second group of US states, initiating a logging function. In some embodiments, initiating a recording function comprises recording a signal from the first mobile device at the server. In other embodiments, initiating a recording function comprises sending, from the server to the first mobile device, a signal which initiates the activation of a recording feature on the first mobile device. According to some embodiments, initiating a logging function comprises logging the location of the second mobile device at the server and deactivating a recording feature of the mobile device and/or server. In some embodiments, the received notification message comprises a GPS location or physical address, and may further comprise at least one of a portable device ID, a button press type, a user ID, and a type of beacon. The mobile device may be a cellular phone, smart phone, tablet computer, or personal assistant device, and the mobile device may be configured to communicate with an electronics package on a portable device.

According to some embodiments, there is also provided a computer comprising a memory and a processor, wherein the processor is configured to perform the above method steps.

According to another aspect, the portable or wearable device (e.g., element 102 in FIG. 1 or 502 in FIG. 5) may comprise a system of grooves to define the location where the wearable device is joined with the electronics enclosure. The grooves may have several benefits. In some embodiments, the grooves may ensure alignment of the electronics enclosure against the wearable device, allow effective adhesion for binding the electronics enclosure to the wearable device, trap excess adhesive (e.g., glue) to improve aesthetic quality of the assembled wearable device, and/or allow removal of the electronics enclosure for maintenance. In other aspects, the portable or wearable device 102 does not comprise grooves for engaging with the electronics enclosure. In some embodiments, the electronics enclosure is secured to the wearable device by at least one of an adhesive, guide rails, and an outline on the wearable device for receiving the electronics enclosure. Other mechanisms known in the art for attaching or securing the electronics enclosure to the wearable device are also within the scope of this disclosure.

Figure 6:
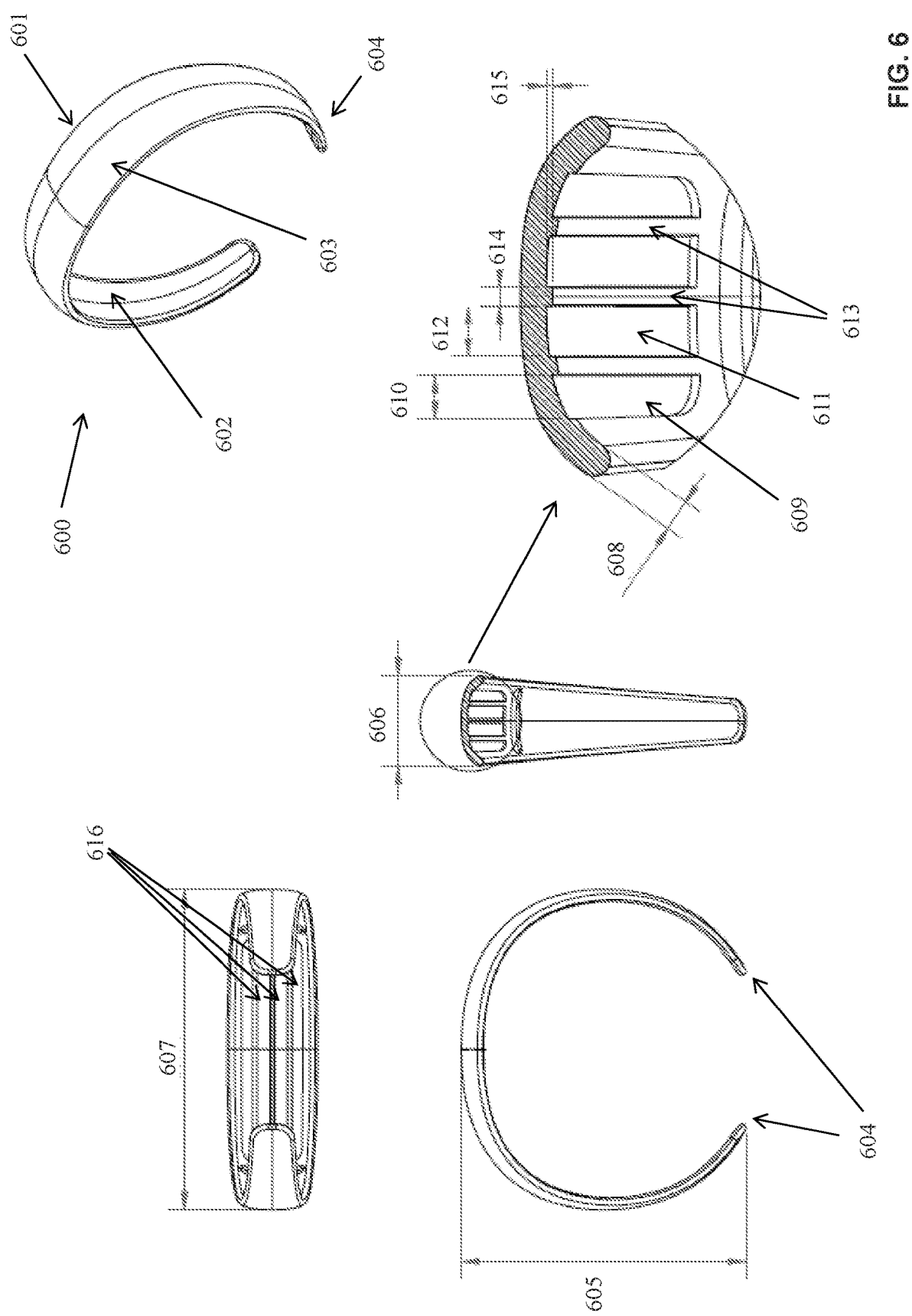
FIG. 6 is a drawing of a bracelet according to some embodiments.

According to some embodiments, the portable or wearable device comprises a piece of jewelry. In some embodiments, the piece of jewelry comprises a band 600, for instance in the form of a cuff bracelet, as depicted in FIG. 6.

In some embodiments, the band 600 comprises a main body 601 with an inner surface 602 configured to be worn against the wrist of a user, an outer surface 603 opposite the inner surface 602, and first and second distal ends 604. The band 600 has a height 605, extending from the top of the main body 601 to the distal ends 604, wherein the height 605 is in the range of about 50 mm to about 60 mm. In some embodiments, the main body 601 has a width 606 in the range of about 16 mm to about 17 mm, e.g., 16.5 mm. In some embodiments, the inner surface 602 of the band 600 comprises a first plurality of grooves 616, wherein the first plurality of grooves 616 extends lengthwise along the inside of the band 600, and wherein a length 607 of the grooves is in the range of about 58 mm to about 65 mm. In some embodiments, the main body 601 of the band 600 has a thickness 608 in the range of about 1 mm to about 1.5 mm.

The first plurality of grooves 616 may comprise a plurality of inner grooves 611 and a plurality of outer grooves 609. In some embodiments, the plurality of inner grooves 611 may have an inner groove width 612 in the range of about 2.25 mm to about 2.65 mm. In some embodiments, the plurality of outer grooves 609 may have an outer groove width 610 in the range of about 2.0 mm to about 2.5 mm. In some embodiments ridges 613 between the grooves of the first plurality of grooves 616 may have a ridge width 614 in the range of about 0.50 mm to about 1.0 mm. The first plurality of grooves 616 extend to a groove depth 615 of about 0.30 mm into the main body 601 of the band 600 in a thickness direction. In some embodiments, an adhesive may be applied to the first plurality of grooves 616 to secure the electronics enclosure to the band 600. In some embodiments, the adhesive may be glue.

Figure 7:
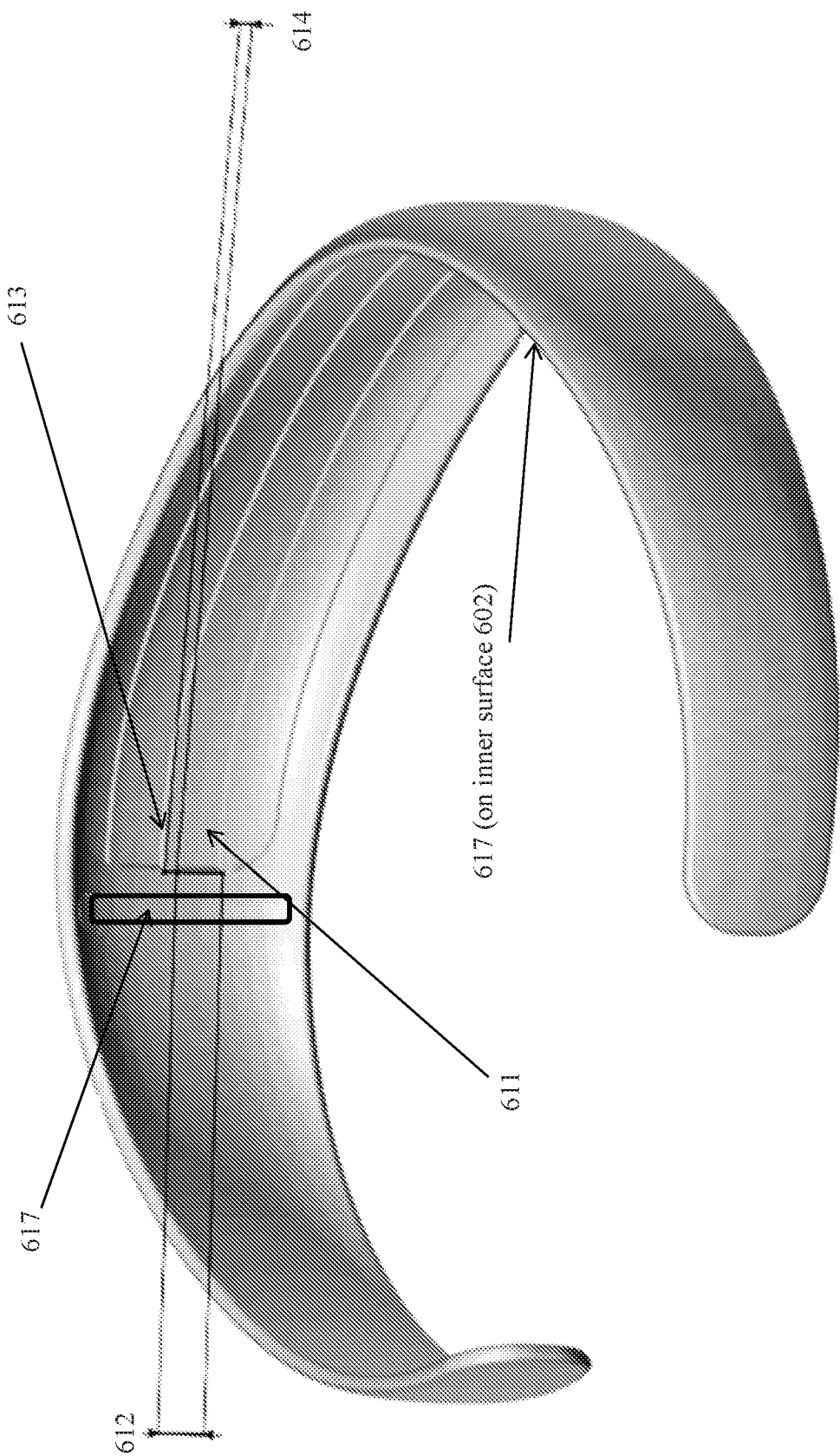
FIG. 7 is a three-dimensional image of a bracelet according to some embodiments.
Figure 8A:
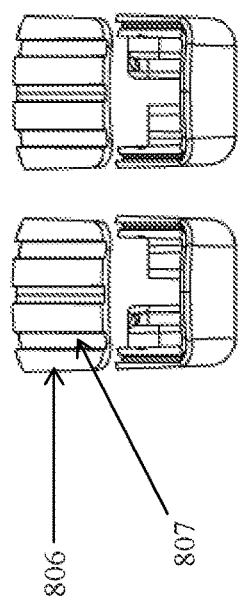
FIGS. 8A-8E are drawings of an electronics enclosure according to some embodiments.
Figure 8B:
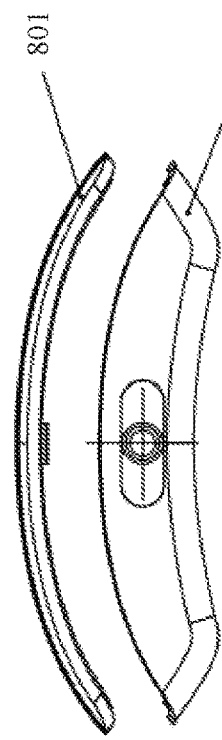
Figure 8C:
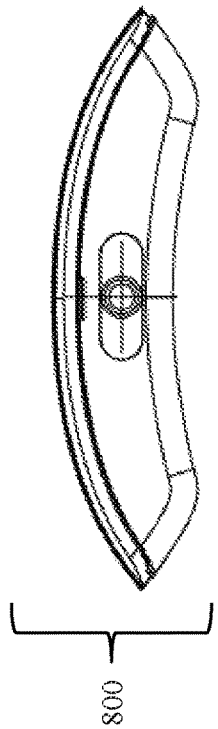
Figure 8D:
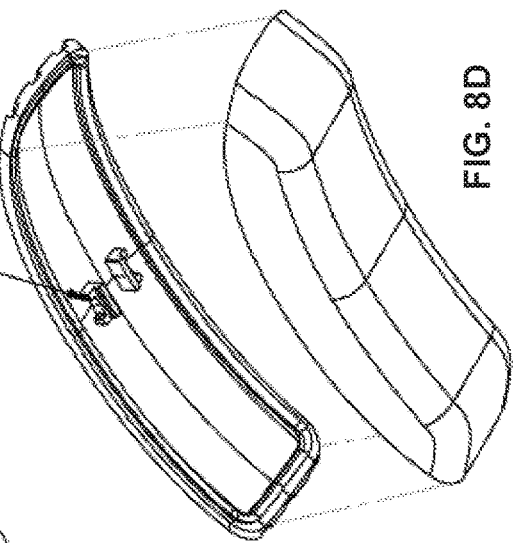
Figure 8E:
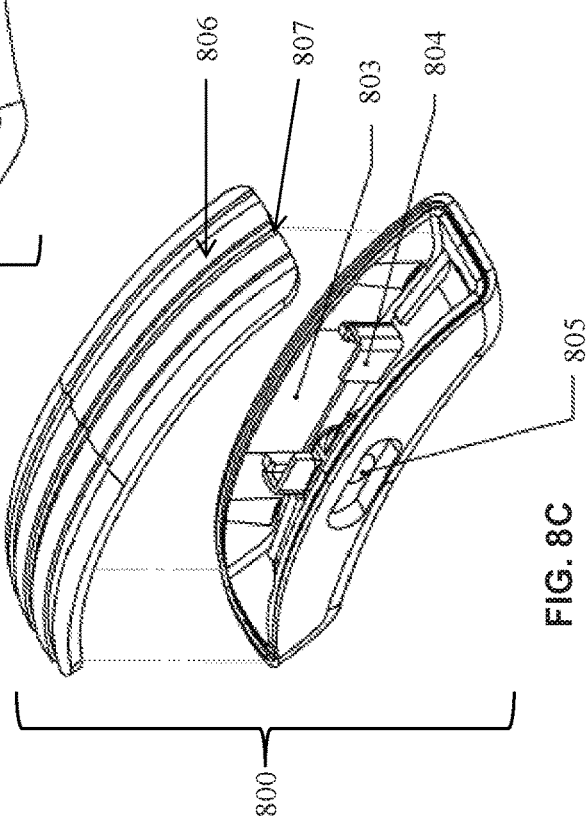

FIG. 7 shows a three-dimensional band 600 according to some embodiments. In some embodiments, a second plurality of grooves 617 are provided on the inner surface 602 of the band. The second plurality of grooves 617 are arranged transversely along the band 600 and are spaced apart so as to accommodate the electronics enclosure and the first plurality of grooves 616 therebetween. In some embodiments, the second plurality of grooves 617 may comprise at least one groove provided on either side of the first plurality of grooves 616. The second plurality of grooves 617 are intended to facilitate bending of the band 600 when fitted onto and removed from the wrist of a user.

Figure 9:
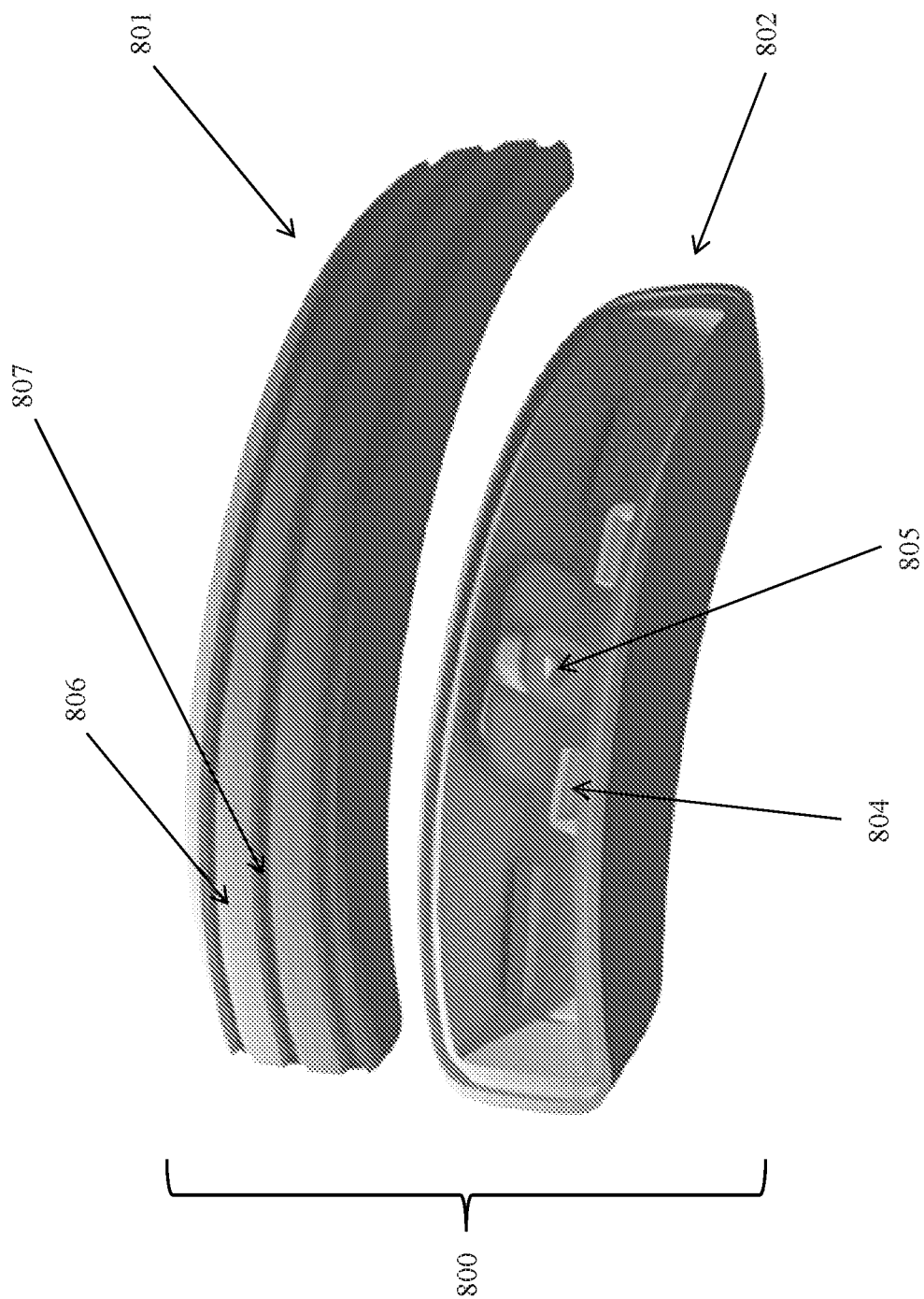
FIG. 9 is a drawing of an electronics enclosure according to some embodiments.

FIG. 8 depicts several views of both halves of an electronics enclosure (or electronics package) 800 according to some embodiments. The enclosure 800 may be used, for instance, on a wearable device 102 or 502. The electronics enclosure 800 may comprise a top 801 and a bottom 802 for housing the batteries and electronics. The top 801 and bottom 802 may be secured together by a known mechanical attachment mechanism (e.g., guide rails, a mortise-and-tenon connection, etc.), an adhesive (e.g., glue), and/or ultrasonic welding. In some embodiments, the bottom 802 of the electronics package 800 comprises a printed circuit board (PCB) placement portion 803 and PCB alignment portions 804 for receiving and securing a PCB. A button shaft hole 805 is provided in a side of the bottom 802 for receiving the button, which comprises a button shaft for engaging with the electronics on the PCB. In some embodiments, the top 801 of the electronics package 800 may comprise a plurality of protrusions 806 for engaging with the first plurality of grooves 616 on the inner surface 602 of the band 600 and a plurality of canals 807 for engaging with the ridges 613 on the inner surface 602 of the band 600. FIG. 9 depicts a three-dimensional image of an electronics enclosure 800 according to some embodiments.

Figure 10:
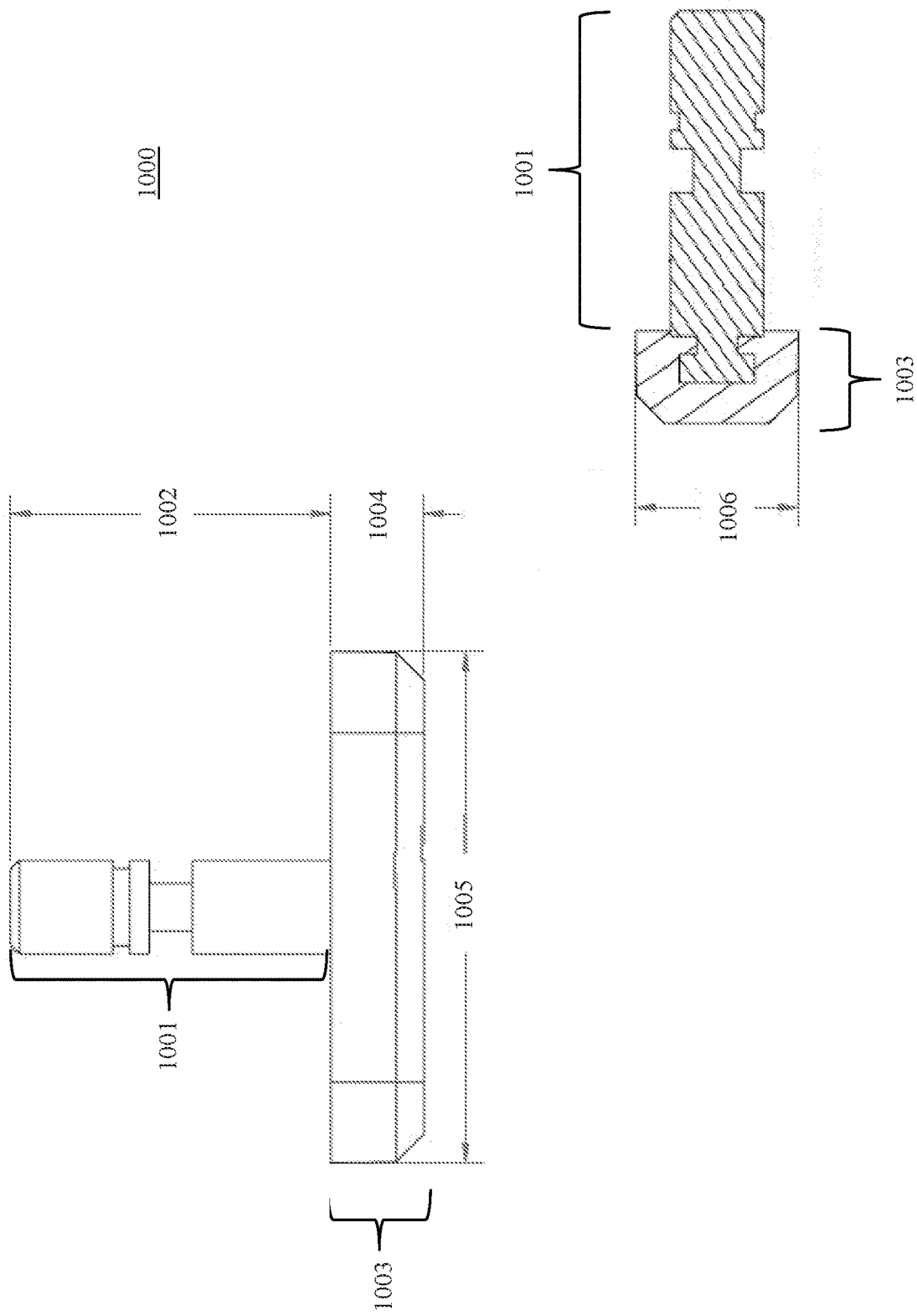
FIG. 10 is a drawing of a button on an electronics enclosure according to some embodiments.

FIG. 10 depicts a button 1000 that may be used to actuate the electronics within the electronics enclosure 800 according to some embodiments. The button 1000 comprises a button shaft 1001, wherein the button shaft 1001 has a button shaft length 1002 of about 5.50 mm. In some embodiments, the button shaft 1001 may comprise a metal material. The button 1000 may further comprise a button top 1003, comprising a button top thickness 1004 of about 1.60 mm, a button top length 1005 of about 8.8 mm, and a button top height 1006 of about 2.80 mm. In some embodiments, the button top 1003 may comprise a VDI-21 texture material, or the same material as the electronics enclosure 800. In some embodiments, an ABS overmold may be applied on an outer surface of the button top 1003. In some embodiments, an EDM/CNC (electrical discharge machining/computer numerical controlled) finish may be applied to an inner surface (proximal to the button shaft 1001) of the button top 1003.

Figure 11A:
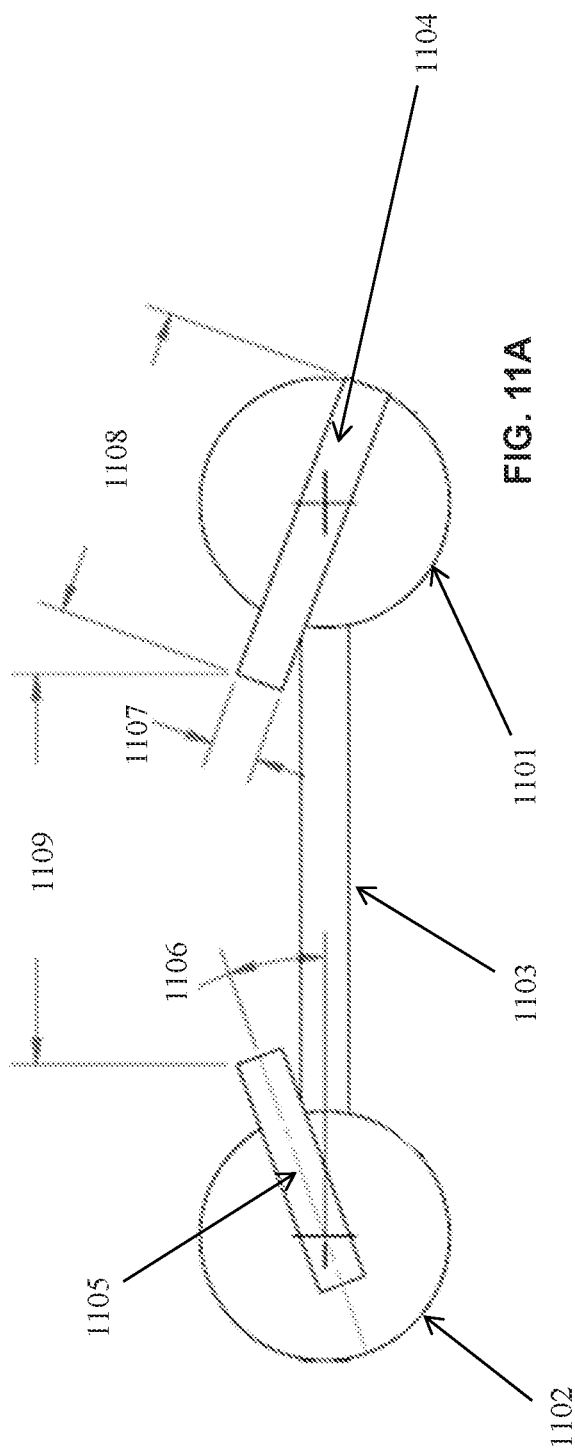
FIGS. 11A and 11B are drawings of a battery configuration within an electronics enclosure according to some embodiments.
Figure 11B:
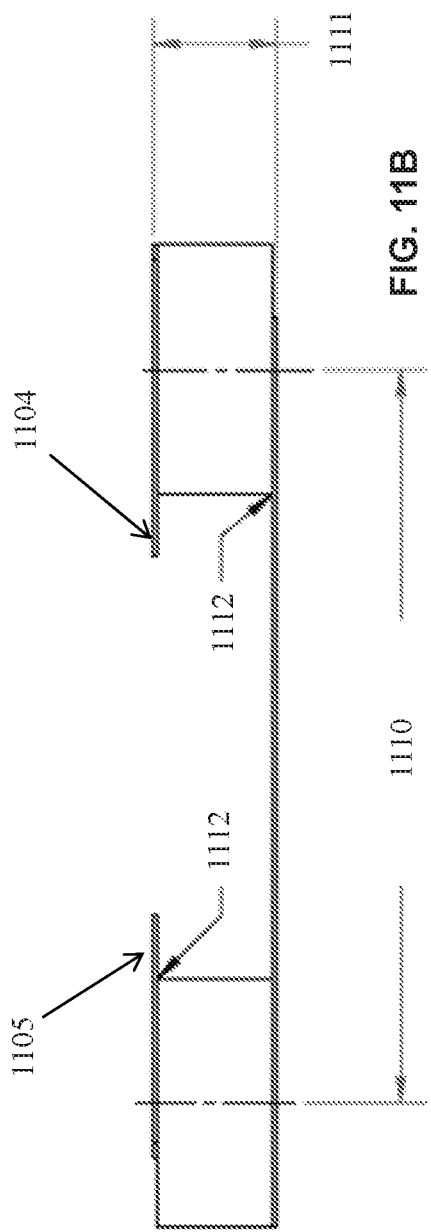

FIG. 11 depicts a battery arrangement 1100 within the electronics enclosure 800 according some embodiments, wherein the battery arrangement 1100 comprises a first battery 1101 and a second battery 1102 connected in series via a connector 1103. The first 1101 and second 1102 batteries may comprise, for example, one or more 392 silver-oxide batteries. A positive connector tab 1104 may be connected to a positive end of the first battery 1101, and a negative connector tab 1105 may be connected to a negative end of the second battery 1102. Each of the positive connector tab 1104 and the negative connector tab 1105 may be positioned at an angle 1106 from the connector 1103, wherein the angle 1106 is an angle of about 20°. Furthermore, each of the positive connector tab 1104 and the negative connector tab 1105 may have a width 1107, wherein the width is about 1.50 mm, and a length 1108, wherein the length is in a range of about 9.5 mm to about 10.5 mm. A distance 1109 between the proximal ends of the positive connector tab 1104 and the negative connector tab 1105 may be in the range of about 11.5 mm to about 13.5 mm. A center distance 1110, or the distance between the center of the first battery 1101 and the second battery 1102 connected in series along the connector 1103, may be in the range of about 23 mm to about 25 mm. The first battery 1101 and the second battery 1102 may have a height 1111 of about 3.90 mm. An insulating layer 1112 may be positioned between the negative ends of the batteries and the negative connector tabs. In some embodiments, the insulating layer may comprise an insulating material, such as insulating tape. In some embodiments, an adhesive (e.g., glue) may be used to underfill the first 1101 and second 1102 batteries to prevent breakage. FIG. 11A depicts a top view of the battery arrangement 1100, and FIG. 11B depicts a side view of the battery arrangement 1100.

FIG. 12 depicts the Bluetooth module assembly 1200 within the electronics enclosure according to some embodiments. FIG. 12A depicts a front view of the Bluetooth module assembly 1200 and FIG. 12B depicts a back view of the Bluetooth module 1202 within the electronics enclosure. A switch 1201 may be provided on the front side of the Bluetooth module 1202, wherein the switch 1201 is configured to engage with a button shaft when the button is pressed. In some embodiments, the center of the switch 1201 is positioned at a distance 1207 of about 2.50 mm from the bottom of the Bluetooth module assembly. In some embodiments, the switch 1201 may comprise a C&K KXT341LHS switch. In some embodiments, the Bluetooth module 1202 may comprise a Taiyo Yuden Eyslsnzww Bluetooth module, and may be positioned at a distance 1208 from the bottom of the assembly, wherein the distance 1208 is about 0.20 mm. The Bluetooth module assembly 1200 may comprise front guide posts 1203 and back guide posts 1204 for positioning and holding the Bluetooth module 1202 within the electronics enclosure (not shown in FIG. 12). In some embodiments, the front guide posts 1203 and back guide posts 1204 may be joined together by a plastic mating edge. A top guide post 1205 may also be provided. In some embodiments, the guide posts may comprise a plastic material. A distance 1206 between the outer edges of the front guide posts 1203 may be about 14 mm. The height 1209 of the Bluetooth module assembly 1200 may about 5.30 mm. The Bluetooth module assembly 1200 assembly may further comprise notches in the top corners thereof, wherein a first notch 1210 is configured to engage with a positive connector tab of at least one battery and a second notch 1211 is configured to engage with a negative connector tab of at least one battery. Each of the first 1210 and second 1211 notches may have a height 1212 of about 1.20 mm and a width 1213 of about 1 mm. In some embodiments, the first 1210 and second 1211 notches may be plated.

According to some embodiments, antennas built into the design of the portable or wearable device (e.g., 102 and/or 502) may be used to optimize Bluetooth transmission reliability for transmitting the beacon(s) from the wearable device to the mobile device or a wireless node. Specifically, the position of a radio relative to a band, for instance inside a piece of jewelry, can be used to cause signal transmissions (e.g., Bluetooth signals) to radiate in a particular direction or omnidirectionally. Thus, signal strength is a function of transmitter angle relative to the receiver. According to some embodiments, a signal having a wavelength of about 2.4 GHz (e.g., between about 2.4 GHz and 2.4835 GHz) is used. In certain aspects, an antenna is optimized between 30 and 40 mm, for example, 31 mm. In some embodiments, the antenna comprises at least one of brass, white metal, white metal alloys, bronze, and stainless steel. In some embodiments, the antenna is plated, wherein the plating material may comprise at least one of silver, gold, rose gold, imitation silver, imitation gold, imitation rose gold, and black plating.

According to some embodiments, the wearable device comprises a piece of jewelry, such as a band 600 or cuff bracelet, which may incorporate an antenna to maximize Bluetooth signal strength. In some embodiments, the antenna may be used as a border around at least some of the surface details of the band, wherein the antenna is integrated into the etched or drawn styles or geometric patterns on the surface of the band. In some embodiments, the antenna may be integrated into the band by using a planar inverted-f antenna (PIFA), which is shaped like a F, and may be hidden in a pattern of inactive or stylistic "F"s.

According to other embodiments, an external antenna, such as an antenna as a visual design detail on the jewelry surface, may be connected to the electronics within the electronics enclosure 800. The electrical connection may be created between the inside of the electronics enclosure 800 and the antenna on the piece of jewelry. Thus, in some embodiments, there may be a connector that does not get glued over when the electronics enclosure 800 is attached to the piece of band 600. Alternatively, in some embodiments, the antenna may be threaded through the glue and through the jewelry.

Figure 13:
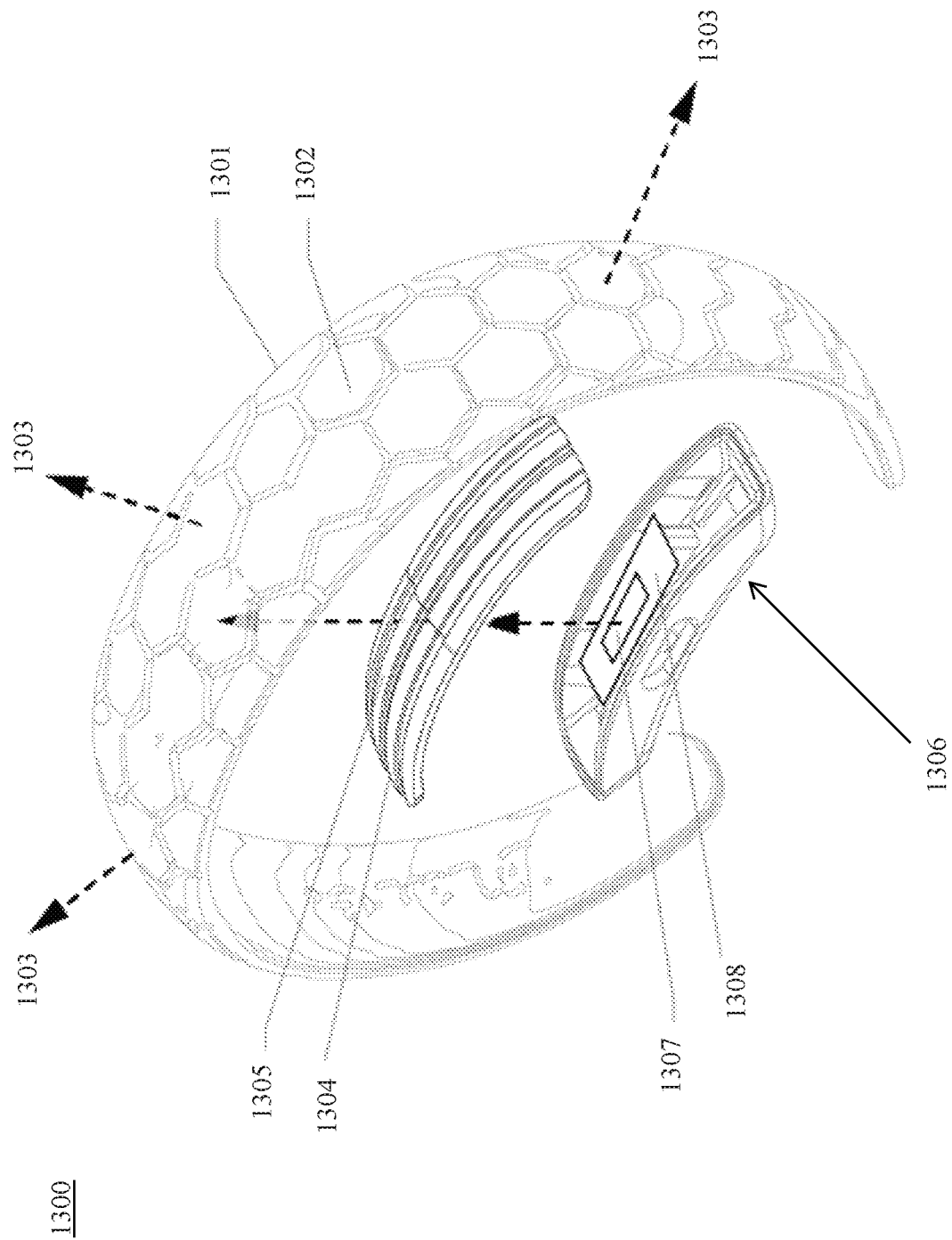
FIG. 13 is a drawing of a passive antenna structure according to some embodiments.

According to some embodiments, the jewelry may operate as a passive antenna structure, which does not require a direct electrical connection between the electronics (e.g., the printed circuit board) and the jewelry. Instead, the jewelry may be positioned to efficiently receive Bluetooth transmissions from the radio frequency device built into the electronics within the electronics enclosure. Specifically, the jewelry may be shaped such that it gathers and then redirects those Bluetooth transmissions. In some embodiments, the surface of the jewelry is styled with a fractal design to radiate the transmissions in as many directions as possible. FIG. 13 illustrates one configuration of a passive antenna structure, wherein the jewelry surface includes a fractal design and wherein there is no direct electrical connection between the electronics (e.g., a printed circuit board and/or an integrated antenna) and the jewelry.

FIG. 13 illustrates a wearable device 1300 comprising a metallic band 1301 as a piece of jewelry, according to some embodiments. The metallic band 1301 may comprise an inner surface, to be worn against the wrist of a user, an outer surface opposite the inner surface, and first and second distal ends. The outer surface of the metallic band 1301 may comprise a fractal design 1302, wherein the fractal design radiates Bluetooth transmissions in an omnidirectional direction 1303. An electronics package, comprising a top 1304 and a bottom 1306 for housing the electronics is secured to the inner surface of the metallic band 1301. The top 1304 and bottom 1306 may be secured together by a known mechanical attachment mechanism (e.g., guide rails, a mortise-and-tenon connection, etc.), an adhesive (e.g., glue), and/or ultrasonic welding. An adhesive 1305 may be applied to the protrusions on the top 1304 to secure the electronics package to the metallic band 1301. In some embodiments, the adhesive is a low dielectric loss epoxy. An integrated antenna 1307 may be positioned on a PCB 1308 within the electronics package. As this configuration does not include any direct electrical connection between the electronics and the metallic band 1301, this is a passive antenna structure.

Figure 14:
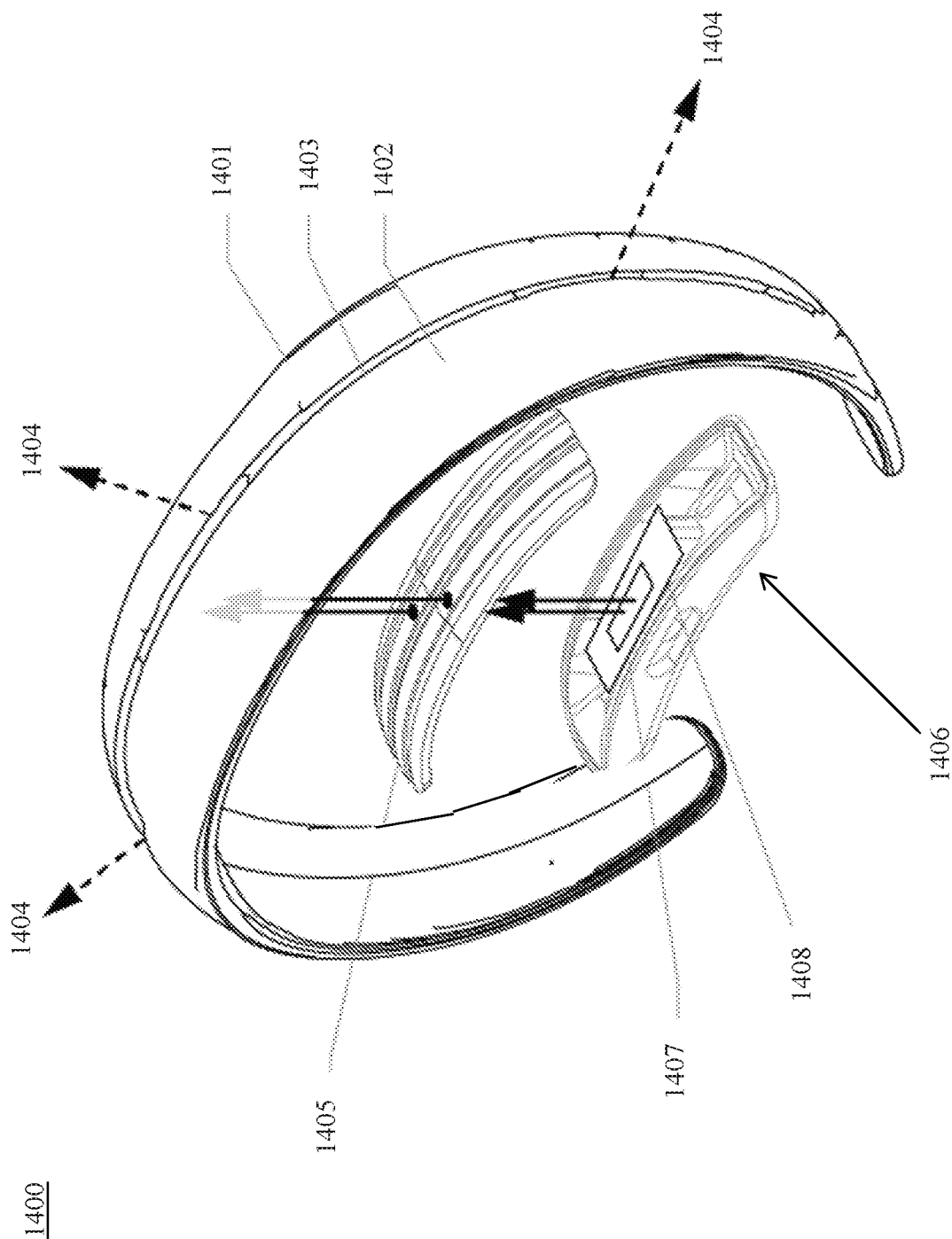
FIG. 14 is a drawing of an active antenna structure according to some embodiments.

According to other embodiments, the jewelry may operate as an active antenna, which may include either proximity coupling or direct electrical connections between the electronics (e.g., the printed circuit board) and the jewelry. FIG. 14 illustrates one configuration of an active dipole antenna, wherein there is a direct wired connection or proximity coupling between the electronics and the jewelry. Specifically, FIG. 14 shows a wearable device 1400 in the form of a band, wherein the band comprises two electrically separated halves, a positive half 1401 and a negative half 1402, that are joined by a piece of non-conducting plastic 1403. An electronics package, comprising a top 1405 and a bottom 1406 for housing the electronics is secured to the inner surface of the band. The top 1405 and bottom 1406 may be secured together by a known mechanical attachment mechanism (e.g., guide rails, a mortise-and-tenon connection, etc.), an adhesive (e.g., glue), and/or ultrasonic welding. Wire connections or proximity coupling 1407 are integrated into the wearable device 1400, providing a direct electrical connection between the electronics on a PCB 1408 within the electronics enclosure and the band. The direct connections create an active dipole antenna, with the Bluetooth transmissions being transmitted in omnidirectional direction 1404. In some embodiments, the non-conducting plastic 1403 is a waveguide built through the middle of the band between the positive half 1401 and the negative half 1402. In some embodiments, the waveguide operates at a frequency of about 2.4 GHz.

Wearable devices 1300 and 1400 may correspond, for instance, to devices 102 and 502 as shown and described with respect to FIGS. 1 and 5.

Referring now to FIG. 15, a communication method 1500 in a portable device (e.g., 102 or 502) is provided according to some embodiments. Step 1510 comprises identifying a user input. Step 1520 comprises determining a status of the user based at least in part on the user input. Step 1530 comprises forming a message identifying the status of the user. Step 1540 comprises transmitting the message from the portable device to a node, wherein the portable device and the node are in a non-connected state.

Referring now to FIG. 16, a method 1600 for manufacturing a wearable (e.g., 102 or 502) is provided according to some embodiments. In step 1610, an electronics package is enclosed within a housing, wherein the housing comprises an upper portion and a lower portion, and wherein an outside surface of the upper portion of the housing comprises a set of channels. Step 1620 comprises fastening the upper portion and lower portion of the housing together. In step 1630, a first plurality of grooves and a second plurality of grooves are formed on an inner surface of a metallic band having a semicircular shape. In step 1640, the housing is adhered to the first plurality of grooves on the inner surface of said metallic band.

Referring now to FIG. 17, a method 1700 for recording mobile device activity according to some embodiments is provided. Step 1710 comprises receiving, on a server, a notification message sent from a first mobile device, wherein the notification message comprises a location of the first mobile device. Step 1720 comprises determining, from the location of the first mobile device, in which US state the first mobile device is located, wherein a first group of US states comprises one-party consent states and wherein a second group of US states comprises two-party consent states. Step 1730 comprises, in response to determining that the first mobile device is located in the first group of US states, initiating a recording function.

Referring now to FIG. 18, a method 1800 for escalating an alert response for a mobile device user according to some embodiments is provided. Step 1810 comprises initiating a telephone call with the mobile device user, wherein said telephone call comprises a pre-recorded voice message. Step 1820 comprises receiving speech content from the mobile device user during said pre-recorded message. Step 1830 comprises analyzing the speech content. Step 1840 comprises, based at least in part on the analyzing, initiating at least one alert action.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A communication method in a portable device, comprising:
   identifying a user input;
   determining a status of a user based at least in part on the user input;
   forming a message identifying the status of the user;
   transmitting the message from the portable device to a node; and comprising at least one of:
receiving a telephone call that is responsive to the message, wherein the telephone call is a pre-recorded message; or
initiating a group text chain that is responsive to the status of the user, wherein the group text chain comprises a text message sent to a set of predefined contacts,
wherein the portable device and the node are in a non-connected state.

2. The method of claim 1, wherein determining a status of the user comprises determining a button press time, and
wherein the user input indicates a first user status for a button press time less than or equal to a first time period, and wherein the user input indicates a second user status for a button press time greater than said first time period.

3. The method of claim 1, wherein the message is a Bluetooth low energy (BLE) beacon.

4. The method of claim 1, wherein forming a message comprises writing a message comprising at least one of Nonce, device type, a device ID, UUID, RSSI, or the user status, and wherein the user status is the determined status of the user.

5. The method of claim 1, further comprising:
identifying a second user input;
determining that the second user input indicates an override status; and
in response to determining that the second user input indicates an override status, sending a second message.

6. The method of claim 5, wherein sending the second message comprises one or more of: entering into a connected state with the node, sending the second message over a WiFi network, and sending the second message over a cellular network.

7. A portable device, comprising:
a processor, wherein the processor is configured to:
identify a user input;
determine a status of a user based at least in part on the user input;
form a message identifying the status of the user;
transmit the message from the portable device to a node; and
comprising at least one of:
receiving a telephone call that is responsive to the message, wherein the telephone call is a pre-recorded message; or
initiating a group text chain that is responsive to the status of the user, wherein the group text chain comprises a text message sent to a set of predefined contacts,
wherein the portable device and the node are in a non-connected state;
a transceiver, wherein the transceiver is connected to the processor; and
a band adapted to be worn by a user,
wherein the processor is mounted on the band and wherein the band is an antenna for the transceiver.

* * * * *